US012466586B2

(12) United States Patent
Sushko et al.

(10) Patent No.: US 12,466,586 B2
(45) Date of Patent: Nov. 11, 2025

(54) SYSTEM AND METHOD FOR GENERATING AERODYNAMIC LIFT FROM WIND SHEAR AT A SYSTEM

(71) Applicant: WindBorne Systems Inc., Palo Alto, CA (US)

(72) Inventors: Andrey Sushko, Sunnyvale, CA (US); Joan Creus Costa, Redwood City, CA (US); Michal Adamkiewicz, Konstancin-Jeziorna (PL); John Lars Anderson Dean, Redwood City, CA (US); Kai Marshland, Palo Alto, CA (US); Iosif-Oliver Szavuj, Bucharest (RO)

(73) Assignee: WindBorne Systems Inc., Palo Alto, CA (US)

( * ) Notice: Subject to any disclaimer, the term of this patent is extended or adjusted under 35 U.S.C. 154(b) by 0 days.

(21) Appl. No.: 18/780,159

(22) Filed: Jul. 22, 2024

(65) Prior Publication Data

US 2025/0026464 A1 Jan. 23, 2025

Related U.S. Application Data

(60) Provisional application No. 63/545,915, filed on Oct. 26, 2023, provisional application No. 63/528,268, filed on Jul. 21, 2023.

(51) Int. Cl.
*B64U 10/30* (2023.01)
*B64B 1/40* (2006.01)
(Continued)

(52) U.S. Cl.
CPC ............... *B64U 10/30* (2023.01); *B64B 1/40* (2013.01); *B64B 1/62* (2013.01); *B64B 1/70* (2013.01);
(Continued)

(58) Field of Classification Search
CPC .... B64U 10/30; B64U 40/00; B64U 2201/10; G05D 1/48; G05D 2109/26; B64B 1/40; B64B 1/62; B64B 1/70
See application file for complete search history.

(56) References Cited

U.S. PATENT DOCUMENTS 4,112,753 A * 9/1978 Call .................... G01W 1/17
340/870.1
6,402,090 B1 * 6/2002 Aaron .................... B64B 1/00
244/31

(Continued)

*Primary Examiner* — Tye William Abell
(74) *Attorney, Agent, or Firm* — Run8 Patent Group, LLC; Peter Miller

(57) ABSTRACT

A system includes: a balloon module; a sail module; a ballast module; and a bridle assembly. The balloon module includes an inflatable element containing a volume of lifting gas. The sail module defining a first edge and a second edge and including: a control surface extending between the first edge and the second edge; payload sensors; and a motorized spool arranged proximal the second edge of the sail module. The ballast module: is arranged below the sail module; and includes a container containing a ballast material. The bridle assembly includes: a set of fixed sail cables coupling the balloon module to the first edge of the sail module; and a sail control cable wound about the motorized spool and coupling the balloon module to the second edge of the sail module.

20 Claims, 11 Drawing Sheets

(51) Int. Cl.
  *B64B 1/62* (2006.01)
  *B64B 1/70* (2006.01)
  *B64U 40/00* (2023.01)
  *G05D 1/48* (2024.01)
  *G05D 109/20* (2024.01)

(52) U.S. Cl.
  CPC .............. *B64U 40/00* (2023.01); *G05D 1/48* (2024.01); *B64U 2201/10* (2023.01); *G05D 2109/26* (2024.01)

(56) References Cited

U.S. PATENT DOCUMENTS

| | | | |
|---|---|---|---|
| 9,845,141 B2 * | 12/2017 | Sehnert | B64B 1/64 |
| 2009/0152391 A1 * | 6/2009 | McWhirk | B64B 1/70 244/30 |
| 2013/0307274 A1 * | 11/2013 | Sia | F03D 9/25 290/55 |
| 2019/0161183 A1 * | 5/2019 | Hagianu | B64C 37/02 |
| 2022/0171897 A1 * | 6/2022 | Ponda | B64B 1/70 |

\* cited by examiner

SYSTEM AND METHOD FOR GENERATING AERODYNAMIC LIFT FROM WIND SHEAR AT A SYSTEM

CROSS-REFERENCE TO RELATED APPLICATIONS

This Application Claims the benefit of U.S. Provisional Application No. 63/545,915, filed on 26 Oct. 2023, and 63/528,268, filed on 21 Jul. 2023, each of which is hereby incorporated in its entirety by this reference.

TECHNICAL FIELD

This invention relates generally to the field of unmanned aircrafts and more specifically to a new and useful system and method for controlling altitude of a lighter-than-air unmanned aircraft in the field of aircrafts.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
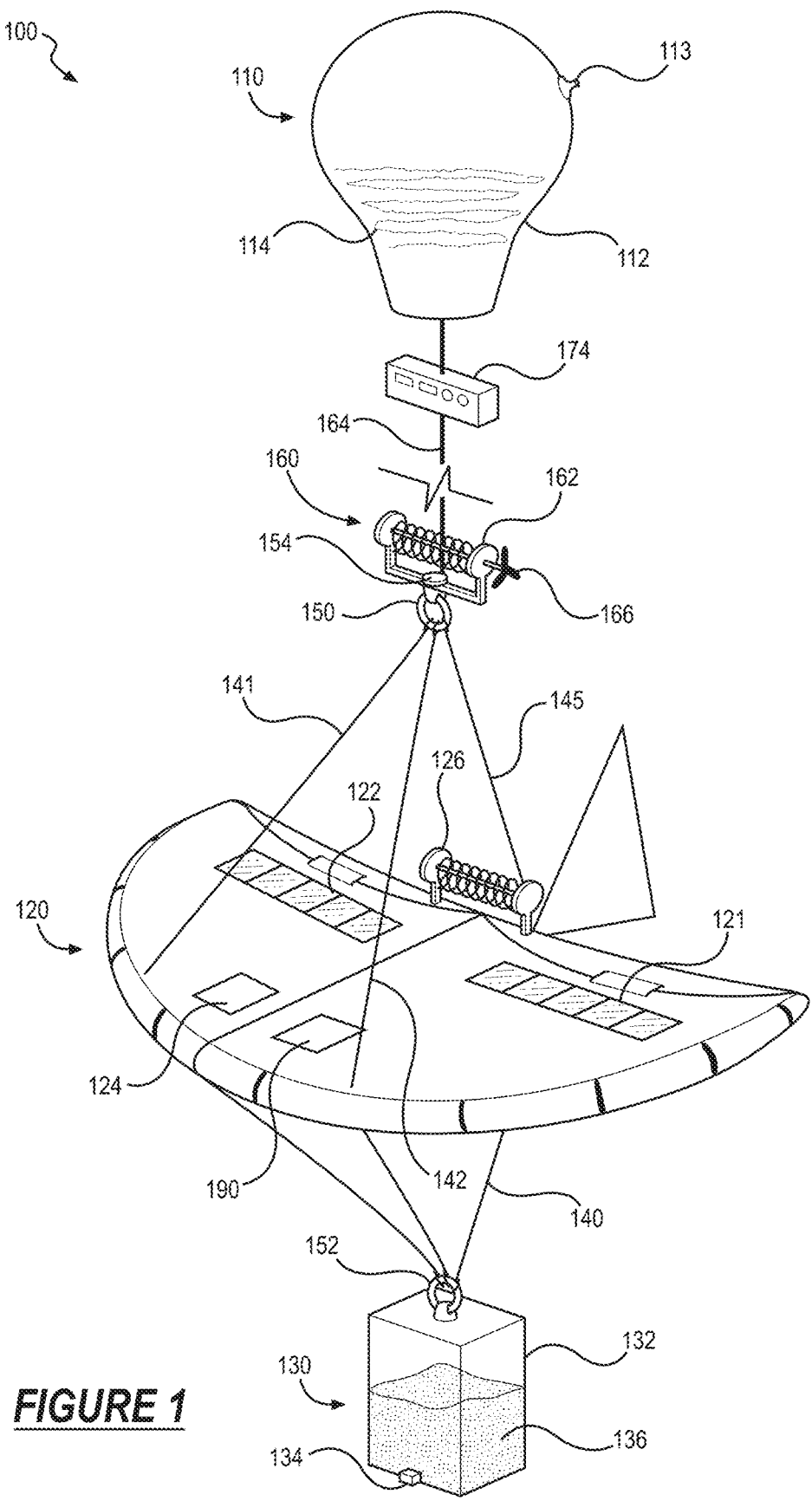
FIG. 1 is a schematic representation of a system.

As shown in FIG. 1, a system 100 includes: a balloon module 110; a first sail module 120; a ballast module 130; a bridle assembly 140; and a controller 190.

The balloon module 110 includes: an inflatable element 112; and a volume of lifting gas 114 arranged within the inflatable element 112 and generating aerostatic lift.

The first sail module 120 defines a first edge and a second edge and includes: a first control surface 122 extending between the first edge and the second edge; a first set of payload instruments 124; and a first motorized spool 126 arranged proximal the second edge of the first sail module 120.

The ballast module 130 includes: a container 132 arranged below the first sail module 120; and a ballast material 136 arranged within the container 132.

The first bridle assembly 140 includes: a first fixed sail cable 141; a second fixed sail cable 142; and a first sail control cable 145. The first fixed sail cable 141: defines a first length; and couples the balloon module 110 to a first section of the first control surface 122 proximal the first edge. The second fixed sail cable 142: defines a second length approximating the first length; and couples the balloon module 110 to a second section of the first control surface 122 proximal the first edge. The first sail control cable 145: is wound about the first motorized spool 126; couples to the balloon module 110; and cooperates with the first fixed sail cable 141 and the second fixed sail cable 142 to locate the first sail module 120 at a distance below the balloon module 110.

The controller 190 is configured to trigger the first motorized spool 126 to wind the first sail control cable 145: to change a pitch angle of the first control surface 122; to change aerodynamic forces across the first control surface 122; and to adjust an altitude of the balloon module 110 and the first sail module 120.

1.1 Variation: Dual Sail+Balloon Module

Figure 2:
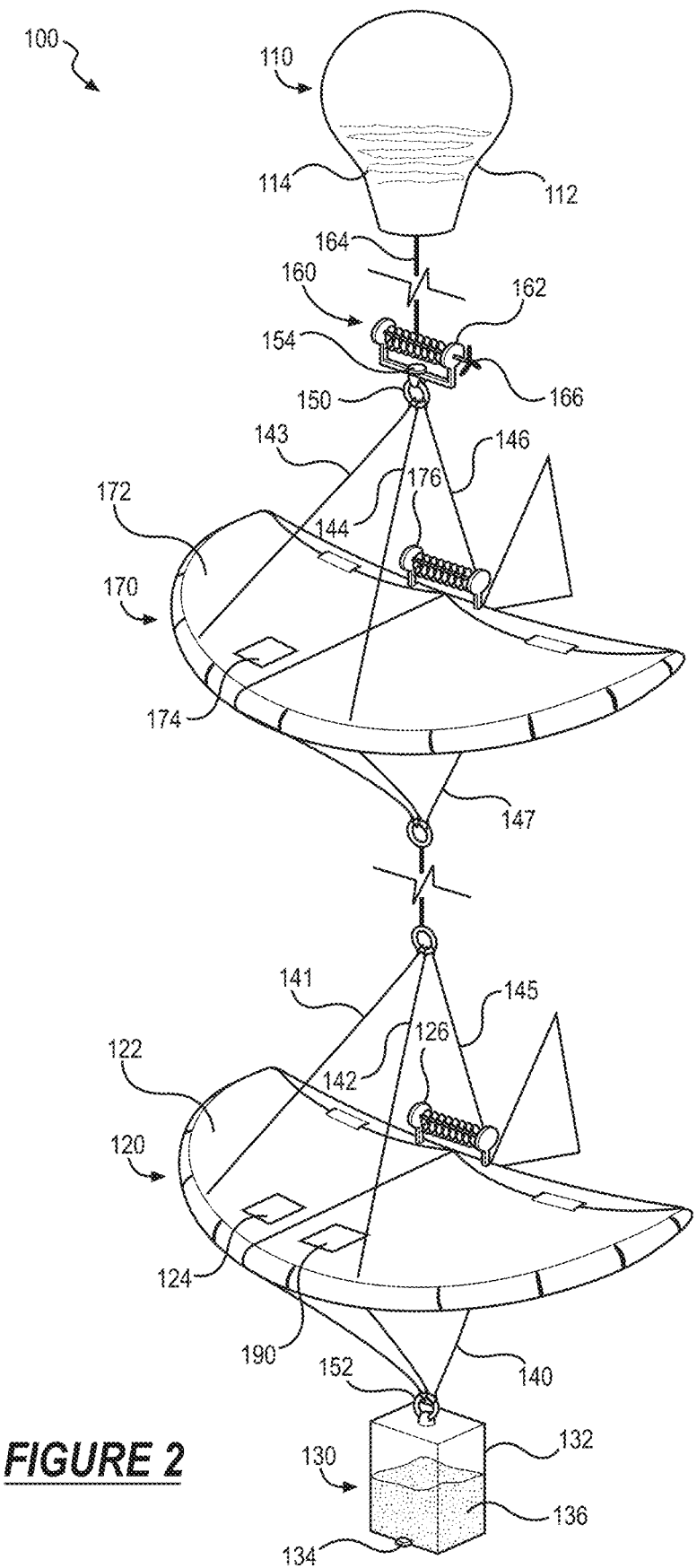
FIG. 2 is a schematic representation of the system.

As shown in FIG. 2, a variation of the system 100 further includes: a second sail module 170; and a second bridle assembly 147.

The second sail module 170 defines a third edge and a fourth edge and includes: a second control surface 172 extending between the third edge and the fourth edge; and a second motorized spool 176 arranged proximal the fourth edge of the second sail module 170.

The second bridle assembly 147 includes: a third fixed sail cable 143; a fourth fixed sail cable 144; and a second sail control cable 146. The third fixed sail cable 143: defines a third length; and couples the balloon module 110 to a third section of the second control surface 172 proximal the third edge. The fourth fixed sail cable 144: defines a fourth length approximating the third length; and couples the balloon module 110 to a fourth section of the second control surface 172 proximal the third edge. The second sail control cable 146: is wound about the second motorized spool 176; couples to the balloon module 110; and cooperates with the third fixed sail cable 143 and the fourth fixed sail cable 144 to locate the second sail module 170 interposed between the balloon module 110 and the first sail module 120.

The controller 190 is configured to trigger the second motorized spool 176 to wind the second sail control cable 146: to change a pitch angle of the second control surface 172; to change aerodynamic forces across the second control surface 172; and to adjust an altitude of the balloon module 110 and the first sail module 120.

1.1.1 Variation: Dual Sail

Figure 3:
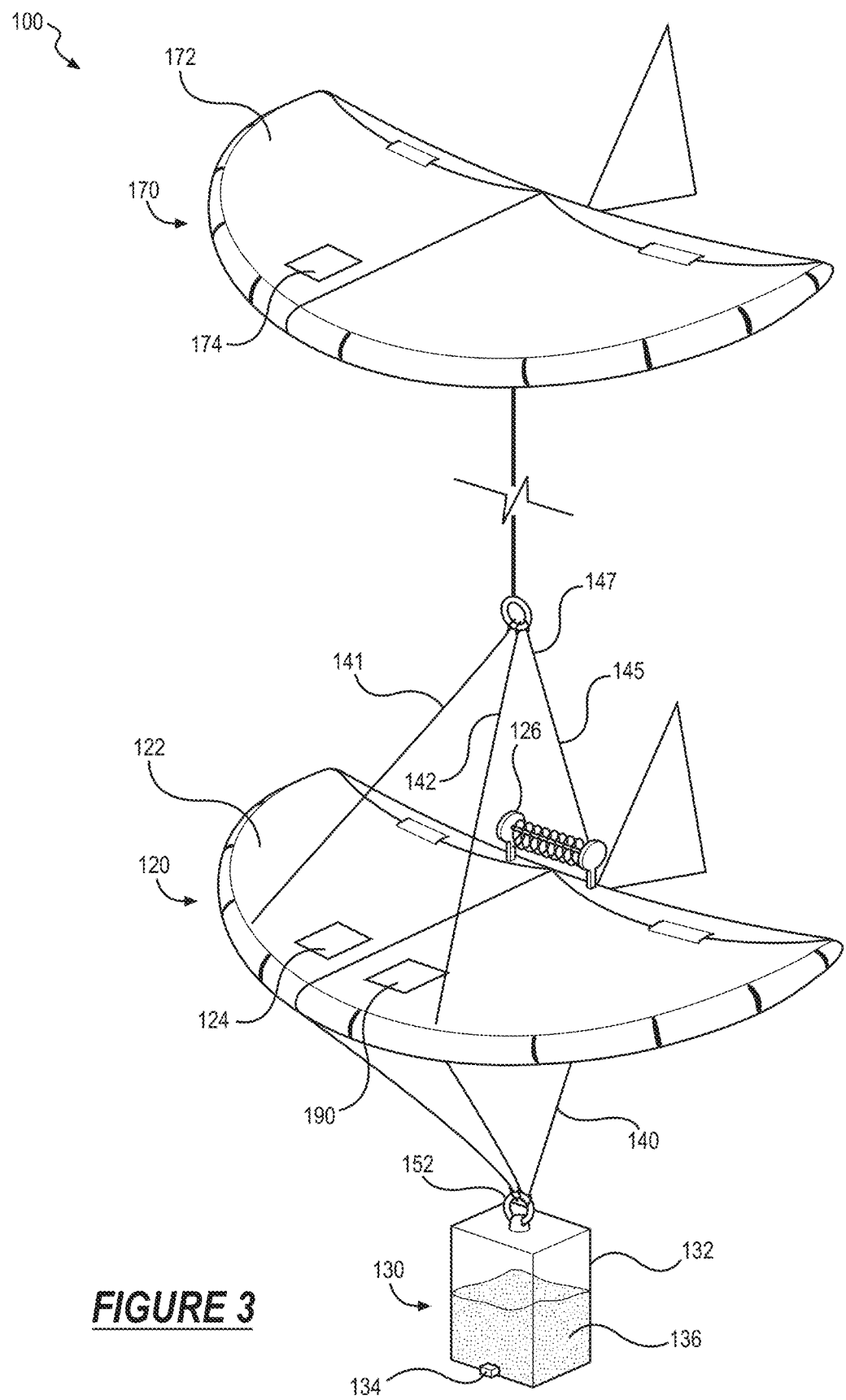
FIG. 3 is a schematic representation of the system.
Figure 4:
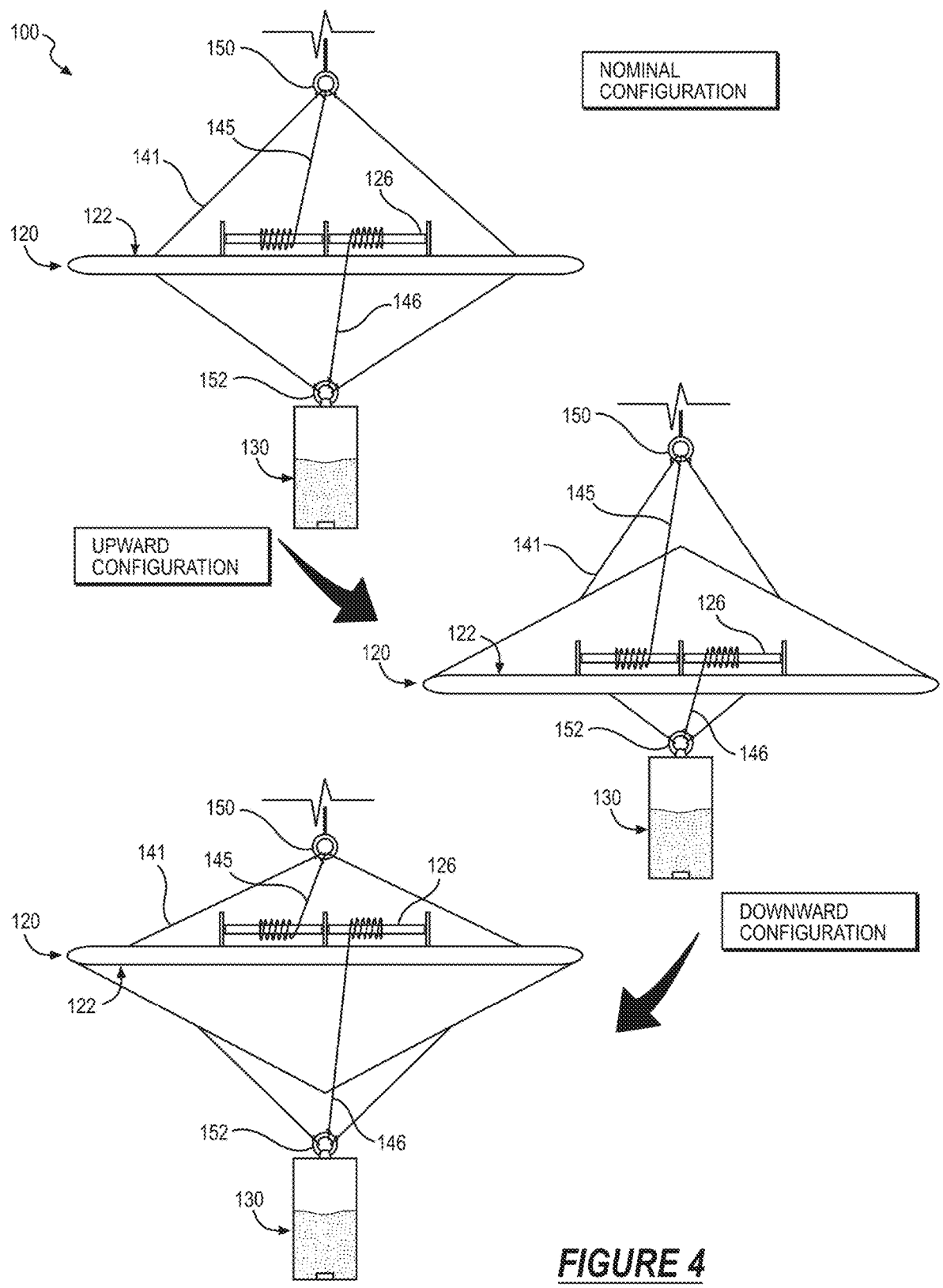
FIG. 4 is a schematic representation of the system.

As shown in FIG. 3, a variation of the system 100 includes: a lower sail module 120; an upper sail module; a first bridle assembly 140; and a controller 190.

The lower sail module 120 defines a first edge and a second edge and includes: a first control surface 122 extending between the first edge and the second edge; a first set of payload instruments 124; and a first motorized spool 126 arranged proximal the second edge.

The upper sail module: is arranged above the lower sail module 120; defines a third edge and a fourth edge; and includes a second control surface 172 extending between the third edge and the fourth edge.

The first bridle assembly 140 includes: a first fixed sail cable 141; a second fixed sail cable 142; and a first sail control cable 145. The first fixed sail cable 141: defines a first length; and couples the upper sail module to a first section of the first control surface 122 proximal the first edge. The second fixed sail cable 142: defines a second length approximating the first length; and couples the upper sail module to a second section of the first control surface 122 proximal the first edge. The first sail control cable 145: is wound about the first motorized spool 126; couples to the upper sail module; and cooperates with the first fixed sail cable 141 and the second fixed sail cable 142 to locate the lower sail module 120 at a distance below the upper sail module.

The controller 190 is configured to trigger the first motorized spool 126 to wind the first sail control cable 145: to change a pitch angle of the first control surface 122; to change aerodynamic forces across the first control surface 122; and to adjust an altitude of the upper sail module and the lower sail module 120.

1.2 Method

Figure 5:
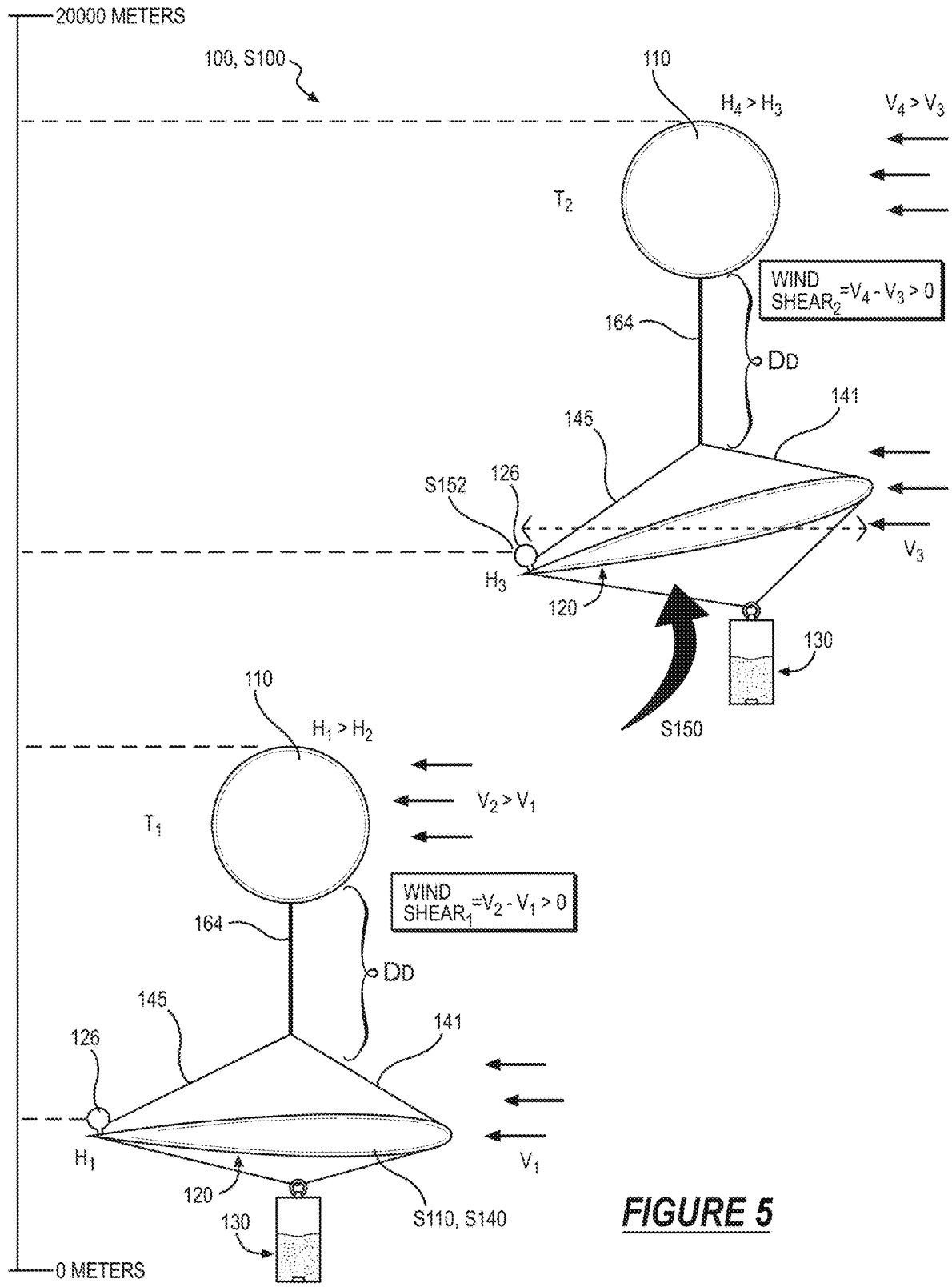
FIG. 5 is a flowchart representation of a method.
Figure 7:
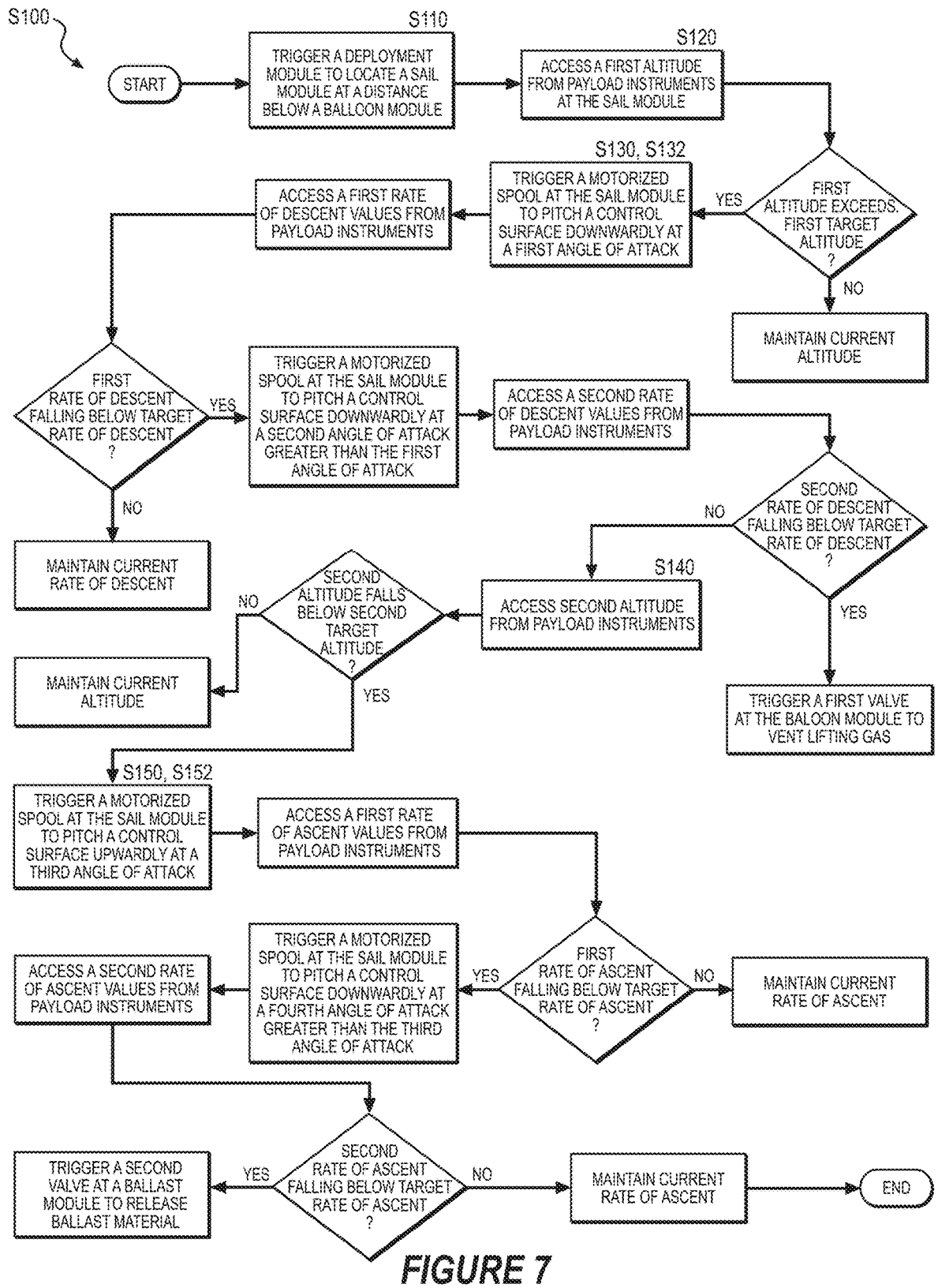
FIG. 7 is a block diagram representation of the method.

As shown in FIGS. 5 and 7, a method S100 for adjusting altitude of a system 100 includes: during a deployment period, triggering a deployment module 160 to unwind a deployment cable 164 to locate a sail module at a distance below a balloon module 110 in Block S110; at a first time, accessing a first altitude from a set of payload instruments coupled to the sail module in Block S120; and, in response to the first altitude exceeding a first target altitude, initiating a first altitude control cycle in Block S130.

The method S100 further includes, during the first altitude control cycle, triggering the motorized spool to wind a sail control cable in a first direction in Block S132: to pitch a control surface of the sail module downwardly; to generate negative aerodynamic lift across the control surface; and to decrease altitude of the balloon module 110 and the sail module.

The method S100 also includes: at a second time, accessing a second altitude from the set of payload instruments coupled to the sail module in Block S140; and, in response to the second altitude falling below a second target altitude, initiating a second altitude control cycle in Block S150.

The method S100 further includes, during the second altitude control cycle, triggering the motorized spool to wind the sail control cable in a second direction, opposite the first direction in Block S150: to pitch the control surface of the sail module upwardly; to generate positive aerodynamic lift across the control surface; and to increase altitude of the balloon module 110 and the sail module.

1.2.1 Variation: Dual Sail

Figure 6:
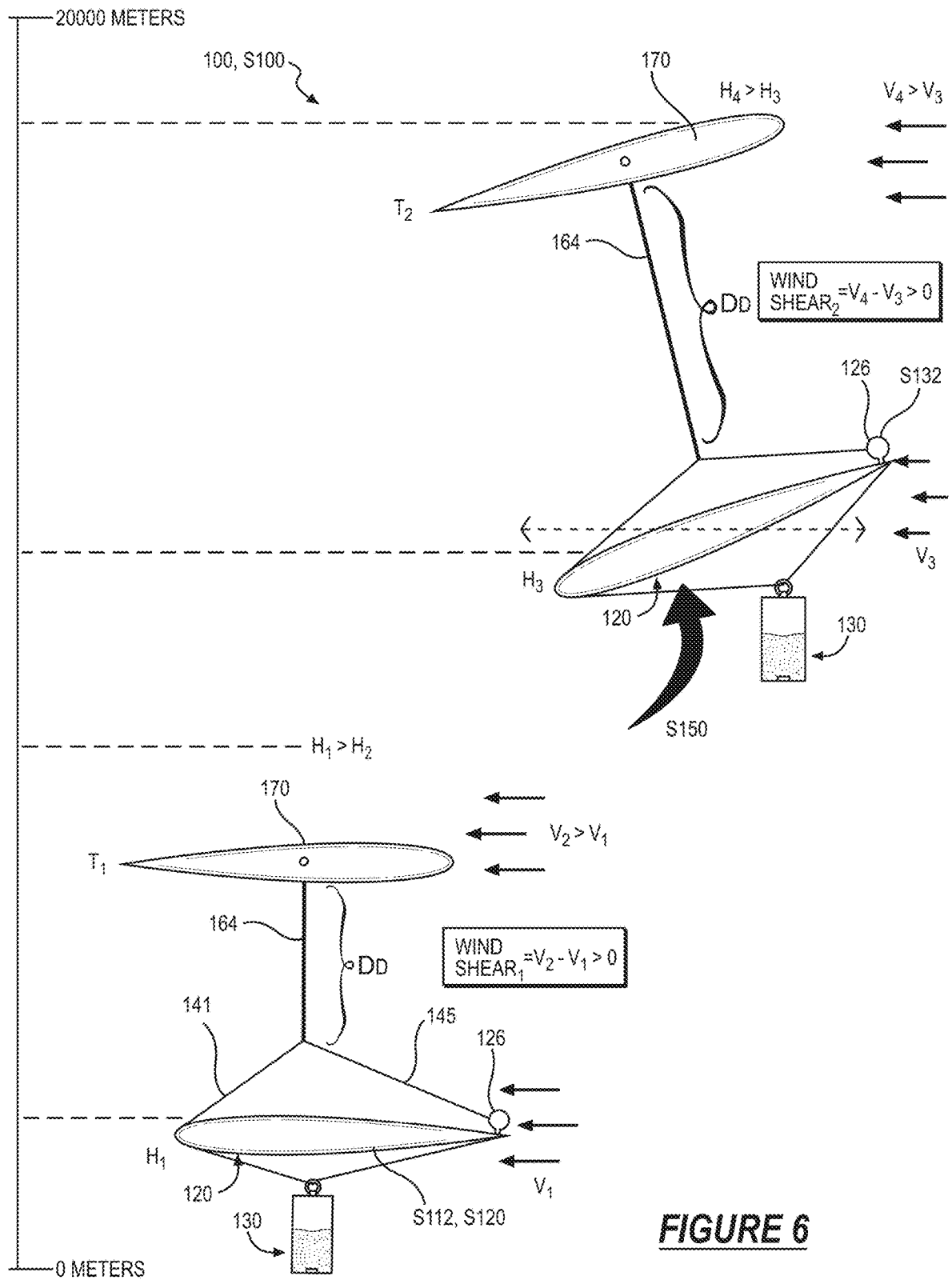
FIG. 6 is a flowchart representation of the method.
Figure 8:
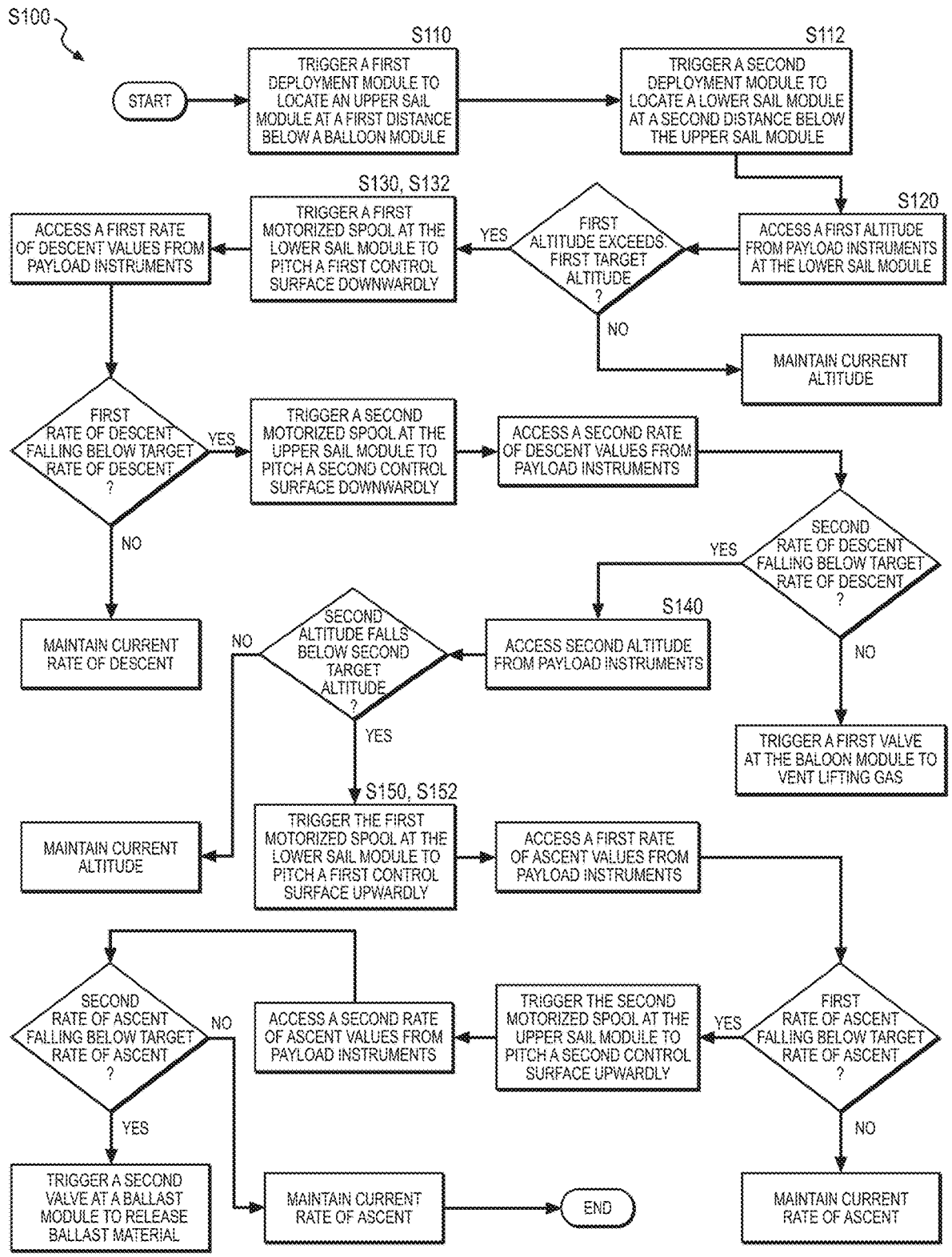
FIG. 8 is a block diagram representation of the method.
Figure 9:
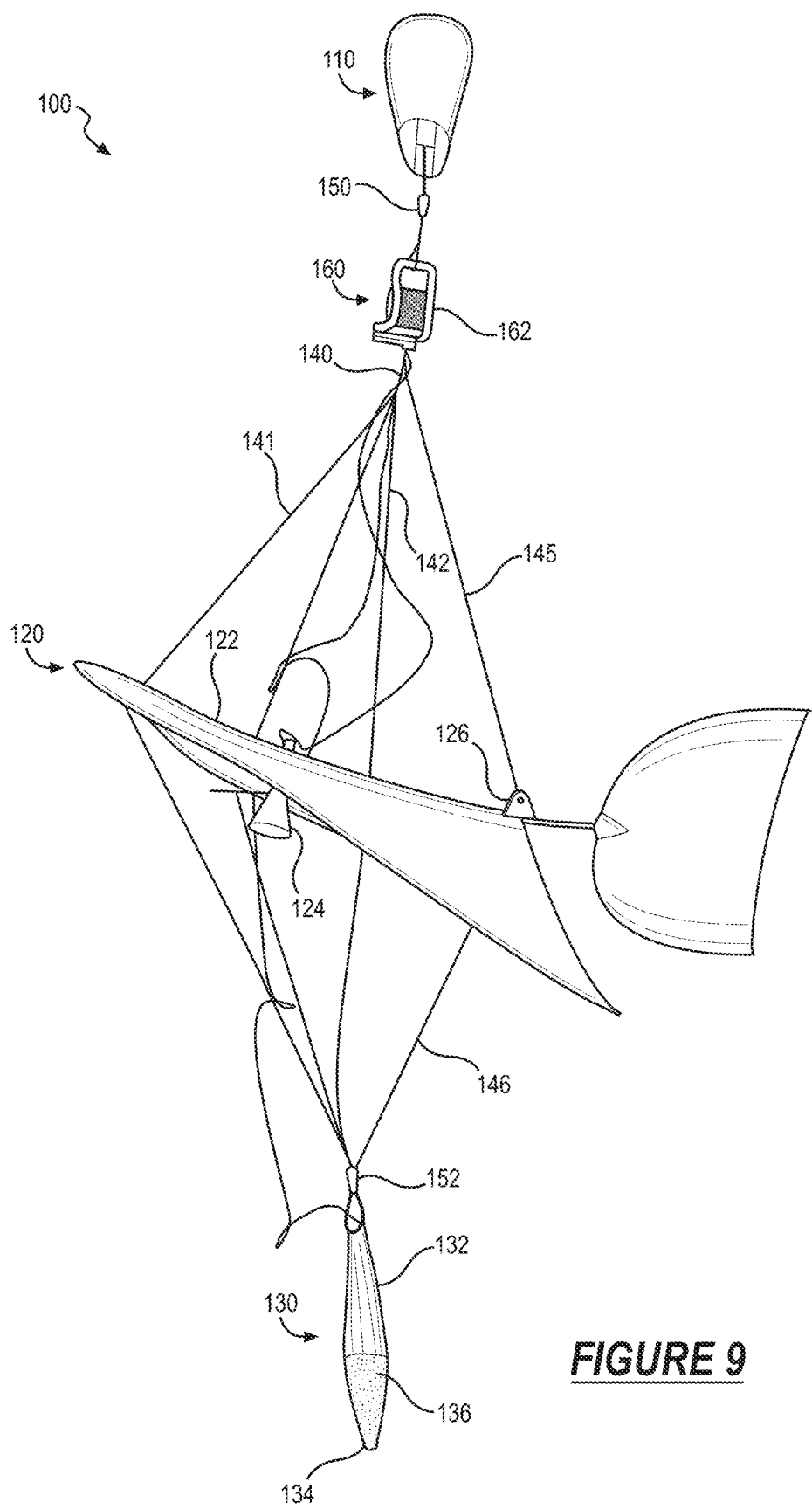
FIG. 9 is a schematic representation of the system.

As shown in FIGS. 6 and 8, a variation of the method S100 for adjusting altitude of a system 100 includes: during a deployment period, triggering a deployment module 160 to unwind a first deployment cable 164 to locate a lower sail module 120 at a first distance below an upper sail module in Block S112; at a first time, accessing a first altitude from a first set of payload instruments 124 coupled to the lower sail module 120 in Block S120; and, in response to the first altitude exceeding a first target altitude, initiating a first altitude control cycle in Block S130.

The method S100 further includes, during the first altitude control cycle, triggering a first actuator coupled to the lower sail module 120 in Block S132: to pitch a first control surface 122 (e.g., elevators) of the lower sail module 120 downwardly; to generate negative aerodynamic lift across the first control surface 122; and to decrease altitude of the upper sail module and the lower sail module 120.

The method S100 also includes: at a second time, accessing a second altitude from the first set of payload instruments 124 coupled to the lower sail module 120 in Block S140; and, in response to the second altitude falling below a second target altitude, initiating a second altitude control cycle in Block S150.

The method S100 further includes, during the second altitude control cycle, triggering the first actuator in Block S152: to pitch the first control surface 122 of the lower sail module 120 upwardly; to increase aerodynamic lift across the first control surface 122; and to increase altitude of the upper sail module and the lower sail module 120.

2. Applications: Sail Module+Balloon Module

Generally, the system 100 functions as a lightweight unmanned aircraft (e.g., lighter-than-air weather balloon, zero pressure balloon, super pressure balloon) configured to: steer (e.g., control altitude, longitude, latitude) the system 100 by generating aerodynamic lift at a control surface 122 coupled system 100 rather than dropping ballast (or "releasing gas") at a balloon of the system 100; and manipulate control surfaces (e.g., wing, elevators) on the system 100 to adjust (e.g., increase, decrease) aerodynamic lift and therefore raise or lower the system 100 to different altitudes characterized by different wind speeds and/or directions. In particular, the system 100 can: extract work resulting from a wind shear velocity between a balloon module 110 (e.g., zero pressure weather balloon, super pressure weather balloon) and a sail module 120 (e.g., planar sail)—tethered at an offset distance from the balloon module 110—of the system 100 to generate aerodynamic lift (e.g., positive lift, negative lift) applied to the system 100; and maintain a target altitude of the system 100 while reducing reliance on dropping ballast at a balloon module 110 to achieve the target altitude during a flight operation. In particular, the system 100 includes: a balloon module 110 (e.g., balloon) containing a lifting gas 114 to generate aerostatic lift into the atmosphere; and a sail module 120 tethered at a target offset distance (e.g., 500-1000 meters) to the balloon module 110 configured to generate aerodynamic lift by modifying a pitch angle for a control surface 122 at the sail module 120 to extract work resulting from a wind shear velocity between the balloon module 110 and the sail module 120.

The sail module 120: is formed of an aerodynamic material defining a substantially horizontal plane (e.g., wing) including aerodynamic surfaces (e.g., elevators) arranged below the balloon module 110; includes a control surface 122 defining a leading edge and a trailing edge; and a first motorized spool 126 coupled to the control surface 122 and configured to wind a first sail control cable 145 to modify (e.g., increase, decrease) a pitch angle of the control surface 122 with respect to a pitch axis (e.g., the leading edge) of the control surface 122 to generate aerodynamic lift for the system 100. Additionally, the system 100 includes a flight controller configured to: detect a deviation from a target altitude for the system 100 in the atmosphere; and, in response to detecting the deviation from the target altitude, execute an altitude control cycle by triggering the first motorized spool 126 to 1) modify (e.g., increase, attenuate) a pitch angle of the control surface 122 with respect to the pitch axis and 2) generate aerodynamic lift at the sail module 120 and therefore the balloon module 110 toward the target altitude.

Generally, an object in lighter-than-air flight experiences variations in wind speed as altitude of the object increases from a launch floor to a target altitude (e.g., maximum altitude) in the atmosphere. Accordingly, during the ascent of the system 100: the balloon module 110 experiences a first absolute wind speed (e.g., 50 knots) at a first altitude (e.g., 3000 meters) in the atmosphere; and the sail module 120 experiences a second absolute wind speed (e.g., 40 knots), different from the first absolute speed, at a second altitude (e.g., 2700 meters), different from the first altitude, in the atmosphere. Accordingly, the system experiences a relative wind speed (e.g., 10 knots) based on the first absolute wind speed and the second absolute wind speed. The differences in relative wind speed experienced by the balloon module 110 and the sail module 120 are resultant from variations in wind velocities across different altitudes within the atmosphere, which then yields a wind velocity gradient between the balloon module 110 and the sail module 120 of the system 100. Thus, the system 100 can: extract work from the resulting wind velocity gradient between the balloon module 110 and the sail module 120 by modifying a pitch angle of the control surface 122 to adjust a current altitude of the system 100; and maintain a target altitude during a flight operation of the system 100.

In one example, during a flight operation, the system 100 can: access a flight path from a remote computer system specifying a target altitude for the system 100 (e.g., 10000 meters); read a first location (e.g., longitudinal, longitudinal, altitude coordinates) from a first position module (e.g., Global Positioning System Unit) coupled to the balloon module 110; and detect a first altitude at the first location deviating from (e.g., falling below) the target altitude for the system 100. The system 100 can then, in response to the first altitude deviating from the target altitude, initiate an altitude control cycle to: detect a first absolute wind velocity (e.g., 40 knots) at the first altitude (e.g., 9000 meters) of the balloon module 110, such as based on a first timeseries of locations read from the first position module; and detect a second absolute wind velocity (e.g., 30 knots) at a second altitude (e.g., 8800 meters) of the sail module 120—tethered at a target offset distance (e.g., 500-1000 meters) below the balloon module 110, such as based on wind speed values read from a wind speed sensor (e.g., indicated airspeed sensor, true airspeed sensor) coupled to the sail module 120.

During the altitude control cycle, the system 100 can then: interpret a wind shear velocity between the balloon module 110 and the sail module 120 based on the first absolute wind velocity of the balloon module 110 and the second absolute wind velocity of the sail module 120; and, in response to the wind shear velocity exceeding a threshold wind speed (e.g., non-zero wind speed), trigger the first motorized spool 126 to increase a pitch angle of the control surface 122 at the sail module 120 to 1) generate aerodynamic lift applied to the system 100 and 2) maneuver the balloon module 110 toward the target altitude. Therefore, the system 100 can: routinely execute altitude control cycles to modify pitch angles of the control surface 122 at the sail module 120 in order to maintain the system 100 at a target altitude without dropping ballast or venting gas; and increase flight hours of the system 100 while conserving ballast (e.g., sand) and gas (e.g., lifting gas 114) of the system 100.

2.1 Applications: Dual Sail

Generally, in this variation, the system 100 functions as a lightweight unmanned aircraft (e.g., lighter-than-air control surface, heavier-than-air control surface) configured to: steer (e.g., control altitude, longitude, latitude) the system 100 by extracting work from a wind shear gradient across the system 100 rather than dropping ballast (or "releasing gas") and/or consuming fuel (e.g., gas, electricity) for propulsion components; and manipulate control surfaces (e.g., wings, elevators) on the system 100 to adjust (e.g., pitch, roll, yaw) orientation of the system 100 and therefore modify a flight direction (e.g., 3D flight direction) of the system 100 according to the wind shear gradient across the system 100. In particular, the system 100 can: induce a windshear gradient resulting from differences between a first wind velocity relative an upper sail module 170 (e.g., inflatable sail) and a second wind velocity relative a lower sail module 120 (e.g., inflatable sail)—tethered at a target offset distance (e.g., 200, 300 meters) from the upper sail module 170—of the system 100; and manipulate a set of control surfaces (e.g., elevators, ailerons) across the upper sail module 170 and/or the lower aileron in order to adjust orientation of the upper sail module 170 and the lower sail module 120 respectively, thereby leveraging the wind shear gradient to induce a total aerodynamic force in a target flight direction at the system 100.

In one example, the system 100 can: detect a first wind velocity relative the upper sail module 170 from a first anemometer coupled to the upper sail module 170; and read a first set of position values from positioning modules (e.g., global positioning unit, inertial measurement units) coupled to the upper sail module 170. The system 100 can then: interpret a first orientation of the upper sail module 170 relative a first flight axis (e.g., relative the direction of gravity) and a second flight axis (e.g., direction of wind shear) based on the first set of position values; and implement aerodynamic computational models (e.g., air flow modeling software) to calculate a first aerodynamic force component applied across the upper sail module 170 based on the first orientation and the first wind velocity.

Similarly, the system 100 can: detect a second wind velocity relative the lower sail module 120 from a second anemometer coupled to the lower sail module 120; and read a second set of position values from positioning modules (e.g., global positioning unit, inertial measurement units) coupled to the lower sail module 120. The system 100 can then: interpret a second orientation of the lower sail module 120 relative a second flight axis (e.g., relative the direction of gravity) based on the second set of position values; and implement aerodynamic computational models (e.g., air flow modeling software, experimental values) to calculate a second aerodynamic force component applied across the lower sail module 120 based on the second orientation and the second wind velocity. Thus, the system 100 can: implement vector computing techniques (e.g., divergence, vector field) to calculate a total aerodynamic force in a first flight direction (e.g., 3D vectors) according to the first aerodynamic force component and the second aerodynamic force component; and, in response to the first flight direction deviating from a target flight direction, initiate a flight control cycle to maneuver the system 100 into the target flight direction.

In this example, during the flight control cycle, the system 100 can: interpret a wind shear gradient between the upper sail module 170 and the lower sail module 120 based on the first wind velocity and the second wind velocity; and implement aircraft maneuvering techniques (e.g., aircraft vectoring) to manipulate control surfaces across the upper sail module 170 and/or the lower sail module 120 to 1) modify orientation of the upper sail module 170 and the second sail module 170 respectively, and 2) extract work from the wind velocity gradient to induce a total aerodynamic force on the system 100 toward the target flight direction.

3. Aircraft

Generally, as shown in FIGS. 1, 2, 9, and 11, the system 100 includes: a balloon module 110 (e.g., balloon) configured to induce aerostatic lift for the system 100; and a sail module 120 (e.g., planar sail) coupled (e.g., tethered) to the balloon module 110 and configured to induce aerodynamic lift for the system 100 in a vertical direction. In particular, the balloon module 110 includes an inflatable element 112: containing a lifting gas 114 (e.g., helium, hydrogen); and configured to generate aerostatic lift (e.g., zero pressure, super pressure) to carry the balloon module 110 and the sail module 120 into the atmosphere. Additionally, the sail module 120: includes a control surface 122 coupled (e.g., tethered) below the balloon module 110 at a target offset distance (e.g., 500-1000 meters) to induce wind shear between the balloon module 110 and the sail module 120; and is configured to generate aerodynamic lift from pressure differences resulting from resultant wind shear across the surfaces of the control surface 122 by modifying a pitch angle of the control surface 122. Thus, the system 100: combines aerostatic lift and aerodynamic lift to increase altitude of the system 100 toward the atmosphere; and leverages wind shear forces across the sail module 120 to induce additional aerodynamic lift into the system 100.

3.1 Balloon Module

In one implementation, the system 100 includes a balloon module 110 (e.g., zero pressure balloon, super pressure balloon) including: an inflatable element 112 (e.g., a balloon) formed of a polymer material (e.g., rubber, latex, silicone, chloroprene, mylar, linear low-density polyethylene, polyethylene terephthalate); and a second set of payload instruments 174 (e.g., radiosonde, weathering instrument) coupled to the inflatable element 112, such as via a tether (e.g., paracord, fishing line). In particular, the inflatable element 112: is configured to contain a lifting gas 114 (e.g., helium) arranged within an interior of the inflatable element 112 to induce aerostatic lift of the balloon module 110 (e.g., zero pressure balloon, super pressure balloon); and includes a balloon valve 113 (e.g., wireless valve) configured to release the lifting gas 114 (e.g., helium) stored within the inflatable element 112 during flight of the inflatable element 112 in the atmosphere. Additionally, the first set of payload instruments 124 (e.g., radiosonde) can include: a suite of sensors (e.g., temperature sensor, humidity sensor, global positioning unit, pressure sensor, gas sensor, gyroscope, accelerometer, wing speed and direction sensor, load cell, inertial measurement unit); and a controller 190 configured to read a set of values (e.g., temperature values, position values) from the suite of sensors and transmit the set of values, such as to a remote computer system associated with a remote operator. In one example, the inflatable element 112 defines an elongated tubular structure including a length ten times greater than a diameter of a circular cross-section of the elongated tubular structure. The balloon module 110 can further include a set of solar panels and/or a battery configured to supply power to the second set of payload instruments 174.

In one implementation, the balloon module 110 functions as a hybrid system that is operable: in a first configuration (e.g., zero pressure configuration) in which the inflatable element 112 is partially inflated with the lifting gas 114 and/or is open at a bottom end; and a second configuration (e.g., super pressure configuration) in which the inflatable element 112 is fully inflated within the lifting gas 114.

Accordingly, during a flight operation the system 100 can, in response to detecting a current altitude of the system 100 exceeding a target altitude: trigger a vent at the inflatable element 112 to release the lifting gas 114 contained within the inflatable element 112; and induce descent of the system 100 toward the target altitude.

3.2 Sail Module

In one implementation, the system 100 includes a sail module 120: coupled to the inflatable element 112 (e.g., via a tether, paracord); defining a substantially horizontal plane (e.g., X, Y plane) arranged below the inflatable element 112 during flight of the system 100 in the atmosphere; and configured to pitch (i.e., tilt forward or backward) along a pitch axis to modify (e.g., increase, decrease) aerodynamic lift applied to the system 100. In particular, the sail module 120 includes a control surface 122 defining: a leading edge configured to distribute wind speed across surfaces (e.g., top surface, bottom surface) of the control surface 122; a trailing edge arranged opposite the leading edge; and a chord line extending from the leading edge toward the trailing edge of the control surface 122 and cooperating with the leading edge and the trailing edge to distribute pressure—resulting from air flow—across the top surface and bottom surface of the control surface 122 to induce a lifting force on the control surface 122 and therefore the overall (i.e., the balloon module 110 and sail module) system 100. Additionally, the sail module 120 can include a vertical stabilizer; arranged proximal to the trailing edge of the control surface 122; extending normal from the substantially horizontal plane defined by the control surface 122; and configured to generate restorative yaw torque to adjust direction of the control surface 122 pointing into the relative wind.

In one example, the control surface 122 includes a unitary inflatable element 112 formed of an inflatable material (e.g., rubber, latex, silicone) that conforms to the shape of the control surface 122 when filled with a gaseous substance (e.g., air, helium, inflated by the windshear) configured to induce aerostatic lift to the system 100. In another example, the control surface 122 is formed of a solid material (e.g., polystyrene foam) and includes: a central strut defining a linear axis; a first wing portion extending normal from a first edge of the central strut; and a second wing portion extending normal from a second edge, opposite the first edge, of the central strut. In yet another example, the control surface 122 includes: a spine defining a linear axis; a spar arranged normal the spine and defining a secondary axis; and a cover (e.g., expandable unitary sheet) arranged across the spine and the spar to form the control surface 122.

In yet another example, the system includes: a central spine; and a bend horizontal spar coupled to the central spine forming the leading edge and configured to apply a spring force to maintain a cover taught across the central spine.

In yet another example, the first sail module 120 includes: a central strut; a front wing spar (e.g., carbon fiber, fiberglass) coupled to a proximal end of the central strut, defining the leading edge; and a rear wing spar (e.g., carbon fiber, fiberglass) coupled to a distal end of the central strut, defining the trailing edge. In this example, the first sail module 120 further includes a cover (e.g., mylar, ripstop nylon, spinnaker cloth) arranged across the central strut, the front wing spar, and the rear wing spar to form a surface (e.g., planar surface) defining: a first wing portion extending from a first edge of the central strut; and a second wing portion extending from a second edge, opposite the first edge of the central strut. Accordingly, the first fixed sail cable 141 couples the first section of the leading edge of the control surface 122 at the first wing portion and the second fixed sail cable 142 couples the second section of the leading edge of the control surface 122 at the second wing portion. Additionally, the first sail module 120 can further include a tail fin: coupled to the distal end of the central strut; arranged orthogonal to the planar surface; and configured to maintain the leading edge of the control surface 122 aligned with a relative wind direction at the sail module 120. Furthermore, the tail fin can also include a horizontal control surface configured to aid in pitch stability/control of the system 100.

In this implementation, the sail module 120 further includes a tether (e.g., paracord): coupling the control surface 122, such as at a central strut of the control surface 122, to the inflatable element 112 of the balloon module 110; and defining a minimum offset distance (e.g., 200, 300 meters) between the balloon module 110 and the sail module 120 in order to induce a wind velocity gradient across the system 100 during a flight operation, as described below. Accordingly, the system 100 can: drop ballast (e.g., release sand) to induce lift of the balloon module 110 into the atmosphere; and induce lift of the sail module 120—coupled to the balloon module 110—into the atmosphere while locating the sail module 120 below the balloon module 110 at the minimum offset distance defined by the tether.

Additionally, the system 100 includes: a power source 121, such as a battery and/or an array of solar panels arranged across the top surface of the control surface 122; a first motorized spool 126 coupled to the trailing edge of the control surface 122 and the power source and configured to modify (e.g., increase, decrease) a pitch angle of the control surface 122 relative to wind velocity; and a flight controller (e.g., a local computer system coupled to the sail module 120) coupled to the first motorized spool 126 and configured to trigger the first motorized spool 126 according to an altitude control prompt, such as from a remote computer system, stored in local memory of the flight controller, and/or calculated from onboard data. Accordingly, during a flight operation, the system 100 can trigger the first motorized spool 126—via the flight controller—to: increase a pitch angle of the control surface 122 relative an angle of attack for a current wind velocity to induce aerodynamic lift across the control surface 122, thereby applying a lifting force to the system 100; and/or decrease a pitch angle of the control surface 122 relative the angle of attack for the current wind velocity to attenuate (or "decrease") aerodynamic lift induced across the sail module 120 and therefore the system 100.

As described above the sail module 120 can further include a second set of payload instruments 174 coupled to control surface and including: a suite of sensors (e.g., temperature sensor, humidity sensor, global positioning unit, pressure sensor, gas sensor, gyroscope, accelerometer, wing speed and direction sensor, load cell, inertial measurement unit); and a controller 190 configured to read a set of values (e.g., temperature values, position values) from the suite of sensors and transmit the set of values, such as to a remote computer system associated with a remote operator Therefore, the system 100 can execute altitude control cycles to: trigger the first motorized spool 126 to modify (e.g., increase, decrease) a pitch angle of the control surface 122, thereby extracting work from a wind velocity gradient between the balloon module 110 and the sail module 120 to induce aerodynamic lift on the system 100; and achieve and maintain a target altitude for the system 100 during a flight operation.

3.2.1 Wing Actuators+Aerodynamic Controls

In one implementation, the aircraft system 100 includes: a power source, such as a battery and/or an array of solar panels arranged across the top surface of the sail; a sail actuator 180 (e.g., mechanical actuator, electric actuator) coupled to control surfaces (e.g., elevator, aileron, rudder) of the sail module 120 and the power source and configured to modify (e.g., increase, decrease) a pitch angle of the sail module 120 relative to wind velocity; and a flight controller (e.g., a local computer system coupled to the aerodyne) coupled to the wing actuator and configured to trigger the sail actuator according to an altitude control prompt, such as from a remote computer system and/or stored in local memory of the flight controller, to modify positions of these control surfaces (e.g., elevator, aileron, rudder) and generate aerodynamic lift of the system. Accordingly, during a flight operation, the aircraft system can trigger the sail actuator—via the flight controller—to: increase a pitch angle of the wing relative an angle of attack for a current wind velocity to induce aerodynamic lift across the wing, thereby applying a lifting force to the aircraft system; and/or decrease a pitch angle of the wing relative the angle of attack for the current wind velocity to attenuate (or "decrease") aerodynamic lift induced across the aerodyne and therefore the aircraft system.

3.3 Ballast Module

In one implementation, the system 100 further includes a ballast module 130: arranged below the sail module 120; and configured to stabilize the balloon module 110 and the sail module 120 during ascent/descent of the system 100. The ballast module 130 can include: a container 132 (e.g., compostable bag); a ballast material 136 (e.g., sand) arranged within the container 132; and a valve 134 (e.g., solenoid valve) coupled to a bottom end of the container 132 and configured to, in response to a ballast release trigger, release the ballast material 136 from the container 132 to increase net aerostatic lift at the balloon module 110 during ascent of the system 100.

Additionally, the ballast module 130 can function as a stabilizer for the sail module 120 in order to maintain the control surface 122 of the sail module 120 in a target configuration (e.g., substantially planar) during flight operation of the system 100. More specifically, the ballast module 130 is arranged below the sail module 120 (e.g., via cables), thereby locating the sail module 120 interposed between the balloon module 110 and the ballast module 130. Accordingly, the weight of the ballast module 130 stabilizes the control surface 122 of the sail module 120 in the target configuration (e.g., substantially planar) and prevents the wind from adjusting the pitch of the sail module 120, thus generating net-zero aerodynamic forces across the control surface 122 to maintain an altitude during flight operation of the system 100.

3.4 Bridle Assembly

In one implementation, the system 100 further includes a bridle assembly 140 including: a set of fixed sail cables coupling the balloon module 110 to the leading edge of the control surface 122; and a set of sail control cables wound about the first motorized spool 126 at the trailing edge of the control surface 122 and cooperating with the set of fixed sail cables to locate the sail module 120 at a distance below the balloon module 110. In this implementation, the system 100 can include: a top anchor 150 (e.g., carabiner) arranged (e.g., tethered) below the inflatable element 112 of the balloon module 110; and a bottom anchor 152 (e.g., carabiner) arranged at a top end of the container 132 of the ballast module 130. Accordingly, the set of fixed sail cables and the set of sail control cables are coupled to the top anchor 150 and the bottom anchor 152, thus locating the sail module 120 interposed between the balloon module 110 and the ballast module 130. Additionally, the set of fixed sail cables and the set of sail control cables cooperate with the ballast module 130 to stabilize and maintain the control surface 122 of the sail module 120 within a nominal plane (e.g., relative to gravity set by the motorized spool).

In one example, the set of fixed sail cables can include a first fixed sail cable 141: defining a first length (e.g., one meter); including a first end coupled to the top anchor 150 of the balloon module 110; and including a second end coupled to the bottom anchor 152 of the ballast module 130. The first fixed sail cable 141 couples the first section (e.g., first wing section) of the leading edge of the first control surface 122 interposed between the first end and the second end of the first fixed sail cable 141. The set of fixed sail cables can further include a second fixed sail cable 142: defining a second length approximating the first length (e.g., one meter); including a first end coupled to the top anchor 150 of the balloon module 110; and including a second end coupled to the bottom anchor 152 of the ballast module 130. The second fixed sail cable 142 couples the second section (e.g., second wing section), adjacent the first section, of the leading edge of the control surface 122 interposed between the first end and the second end of the second fixed sail cable 142.

In this example, the first motorized spool 126: is arranged at the trailing edge of the control surface 122; and includes a first spool section and a second spool section, adjacent the first spool section. The set of sail control cables includes a first sail control cable 145 including: a first end coupled to the top anchor 150 of the balloon module 110; and a second end wound about the first spool section of the first motorized spool 126 in a first direction to define a third length (e.g., 0.5 meters) from the balloon module 110. Additionally, the set of sail control cables can include a second sail control cable 146: including a first end coupled to the bottom anchor 152 of the ballast module 130; including a second end wound about the second spool section of the first motorized spool 126 in a second direction, opposite the first direction, to define a fourth length-approximating the third length (e.g., 0.5 meters)—from the ballast module 130; and cooperating with the first sail control cable 145 to define a total cable length approximating the first length and the second length (e.g., one meter) of the first fixed sail cable 141 and the second fixed sail cable 142.

Accordingly, the set of fixed sail cables cooperates with the set of sail control cables to form a triangular cable frame: enclosing the control surface 122 of the sail module 120; and locating the sail module 120 interposed between the balloon module 110 and the ballast module 130.

The controller 190 can then trigger the motorized spool to wind the first sail control cable 145 and the second sail control cable 146: to change a pitch angle of the control surface 122 (e.g., about the leading edge); to increase aerodynamic forces (e.g., positive, negative lift forces) across the control surface 122; and to adjust (e.g., increase, decrease) altitude of the balloon module 110 and the sail module 120. More specifically, the controller 190 can trigger the first motorized spool 126 to wind the first sail control cable 145 and the second sail control cable 146 in a first direction, resulting in: increase of the third length (e.g., 0.7 meters) of the first sail control cable 145 from the balloon module 110; and decrease of the fourth length (e.g., 0.3 meters) of the second sail control cable 146 from the ballast module 130 to downwardly pitch the control surface 122 about the leading edge while maintaining approximation to the first length and the second length (e.g., one meter) of the first fixed sail cable 141 and the second fixed sail cable 142.

Similarly, the controller 190 can trigger the first motorized spool 126 to wind the first sail control cable 145 and the second sail control cable 146 in a second direction opposite the first direction, resulting in: decrease of the third length (e.g., 0.3 meters) of the first sail control cable 145 from the balloon module 110; and increase of the fourth length (e.g., 0.7 meters) of the second sail control cable 146 from the ballast module 130 to upwardly pitch the control surface 122 about the leading edge while maintaining approximation to the first length and the second length (e.g., one meter) of the first fixed sail cable 141 and the second fixed sail cable 142.

Therefore, the bridle assembly 140: functions as a stabilizer cooperating with the ballast module 130 to maintain the control surface 122 of the sail module 120 in a nominal planar configuration; and defines a pitch axis about the leading edge of the control surface 122. In other variations, the bridle assembly 140 can include any number of combinations of fixed sail cables and sail control cables coupling the sail module 120 to the balloon module 110 and the ballast module 130.

3.5 Deployment Module

In one implementation, the system 100 further includes a deployment module 160: coupling the balloon module 110 to the sail module 120; and configured to, during a deployment period, locate the sail module 120 at a distance (e.g., between 500 and 1000 meters) below the balloon module 110. The deployment module 160 includes: a deployment spool 162, such as coupled to the control surface 122 of the sail module 120 or arranged below the inflatable element 112 of the balloon module 110; a deployment cable 164 including a first end coupled to the top anchor 150 of the balloon module 110 and a second end wound about the deployment spool 162 and coupling the sail module 120 to the balloon module 110; and a rate regulator 166 (e.g., air resistance governor) coupled to the deployment spool 162 and configured to induce aerodynamic drag to govern an unwinding rate of the deployment spool 162.

During a deployment period, the deployment module 160 transitions from a first deployment configuration to a second deployment configuration in order to locate the sail module 120 at a distance below the balloon module 110. More specifically, at an initial time during a deployment period, the deployment cable 164 is wound about the deployment spool 162 to locate the sail module 120 at a first distance (e.g., one meter) below the balloon module 110. Furthermore, at a second time following the initial time, the controller 190 can then trigger the deployment spool 162—such as in response to detecting a target altitude (e.g., 5000 meters) of the sail module 120 and/or in response to receiving an altitude control prompt from a remote computer system—to unwind the deployment cable 164 from the deployment spool 162 and thus, locate the sail module 120 at a second distance (e.g., between 500 meters and 1000 meters), greater than the first distance, from the balloon module 110.

In other example variations, the system can implement other structures and mechanisms to the deployment module 160 to control an unwinding rate of the deployment cable 164, such as including: a centrifugal and friction governor; an oil based rotary damper; an Eddy current brake; a regenerative braking motor (e.g., configured to generate power for a power source of the system 100); and a center wound spool (e.g., two cables extending from a top and bottom of the deployment spool 162 for reduced stress in the unwound state).

4. Wind Shear

Generally, as shown in FIGS. 5 and 6, an object in lighter-than-air flight experiences "varying" wind speed as altitude of the object increases from a launch floor to a target altitude in the atmosphere. In particular, during a flight operation, the system 100 can: drop ballast (e.g., release sand) to induce ascent of the balloon module 110 into the atmosphere; and subsequently induce lift of the sail module 120—coupled below the balloon module 110—as the balloon module 110 increases altitude into the atmosphere. Accordingly, during the ascent of the system 100: the balloon module 110 experiences a first wind speed (e.g., 50 knots) at a first altitude (e.g., 3000 meters) in the atmosphere; and the sail module 120 experiences a second wind speed (e.g., 40 knots), different from the first wind speed, at a second altitude (e.g., 2700 meters), different from the first altitude, in the atmosphere. The differences in wind speed experienced by the balloon module 110 and the sail module 120 are resultant from variations in wind velocities (i.e., wind speed vectors) across different altitudes into the atmosphere, which then yields a wind velocity gradient between the balloon module 110 and the sail module 120 of the system 100. Thus, the system 100 can: extract work from the resulting wind velocity gradient between the balloon module 110 and the sail module 120 by modifying a pitch angle of the control surface 122 to adjust a current altitude of the system 100; and maintain a target altitude during a flight operation of the system 100.

In one implementation, during a deployment period, the system 100: triggers deployment (e.g., releases gas into the inflatable element 112 and/or drop ballast) of the balloon module 110—carrying the first set of payload instruments 124—into the atmosphere; and induces lift of the inflatable element 112 to a first target altitude in the atmosphere. Accordingly, the system 100 during the deployment period: locates the sail module 120 at a target offset distance (e.g., 500-1000 meters) below the balloon module 110 defined by the tether (e.g., paracord) as the balloon module 110 lifts into the atmosphere; and transforms energy extracted from a wind velocity gradient between the balloon module 110 and the sail module 120 to modify (e.g., increase, decrease) altitude of the system 100. In this implementation, during the deployment period: the balloon module 110 experiences a change (e.g., increase) in wind velocity as the inflatable element 112 increases in altitude in the atmosphere; and the sail module 120—located at a target offset distance (e.g., 500-1000 meters) below the balloon module 110—experiences relative wind velocities different from (e.g., less than) the relative wind velocities experienced by the balloon module 110 during ascent, which then results in a positive and/or negative velocity gradient between the balloon module 110 and the sail module 120.

Thus, at a first time during the flight operation: the balloon module 110 experiences a first wind velocity at a first altitude in the atmosphere; and the sail module 120 experiences a second wind velocity, less than the first wind velocity, at a second altitude, less than the first altitude of the balloon module 110, which then results in a velocity difference. As such, during the flight operation, the system 100 can leverage this velocity difference to modify overall altitude of the system 100 (i.e., of the balloon module 110 and the sail module 120), such as by triggering the actuator (e.g., servo motor) to modify (e.g., increase, decrease) a pitch position of the control surface 122. In particular, the system 100 can, in response to a current altitude of the system 100 deviating from a target altitude during the flight operation: detect a first wind speed at the balloon module 110, such as based on positioning signals read from a first positioning sensor at the inflatable element 112; detect a second wind speed at the sail module 120, such as based on wind speed values read from a wind speed sensor (e.g., cup anemometer, hot wire, ultrasonic anemometer, pitot tube, venturi effect sensor) at the control surface 122; and interpret a non-zero velocity difference between the balloon module 110 and the sail module 120. The system 100 can then trigger the actuator (e.g., servo motor) to modify (e.g., increase, decrease) pitch of the control surface 122 to induce repositioning of the system 100 toward the target altitude based on the first velocity difference.

Therefore, during a flight operation, the system 100 can: interpret wind velocity gradients between the balloon module 110 and the sail module 120; and maintain a target altitude during the flight operation by modifying a pitch of the control surface 122 based on the wind velocity gradients.

In one example, such as during ascent of the system 100 into the atmosphere, the system 100 can: detect a first altitude (e.g., 8000 meters) of the balloon module 110, such as based on a first position value read from a first positioning sensor at the inflatable element 112; and, in response to the first altitude (e.g., 8000 meters) deviating from a target altitude (e.g., 11000 meters) initiate an altitude control cycle at the system 100. In this example, during the altitude control cycle, the system 100 can: interpret a first wind speed (e.g., 50 knots) for the balloon module 110 at the first altitude (e.g., 8000 meters), such as based on a first time-series of locations read from the first positioning sensor at the inflatable element 112; interpret a second wind speed (e.g., 30 knots) for the sail module 120 arranged below the balloon module 110, such as based on wind speed values read from a wind speed sensor at the control surface 122; and calculate a wind speed difference (e.g., 20 knots) between the first wind speed (e.g., 50 knots) at the balloon module 110 and the second wind speed (e.g., 30 knots) at the sail module 120.

In another example, during a flight operation (e.g., rise/fall of the system), the system 100 can: at a first time corresponding to a first altitude (e.g., 8000 meters), read a first absolute wind speed from a wind speed sensor at the balloon module; at a second time following to the first time and corresponding to a second altitude different from the first altitude (e.g., 9000 meters) read a second absolute wind speed from the wind speed sensor; and interpret a wind shear of the system based on the first absolute wind speed and the second absolute wind speed.

The system 100 can then, in response to the wind velocity difference (e.g., 20 knots) exceeding a threshold velocity difference (e.g., 5 knots), trigger an actuator (e.g., servo motor) at the control surface 122 to increase a pitch of the control surface 122 in order to: 1) increase the angle of attack of the control surface 122 thereby inducing lift of the control surface 122—and therefore the balloon module 110—resulting from wind flow across the surface of the control surface 122; and 2) induce lift of the system 100 toward the target altitude (e.g., 11000 meters) while conserving ballast and lifting gas 114 at the balloon module 110. In one variation, the system can: interpret an angle of attack for the resultant wind shear based on the first wind speed and the second wind speed; and trigger the actuator to modify a pitch of the control surface to maintain a constant angle offset from the oncoming relative wind.

Therefore, the system 100 can: extract work from a wind velocity gradient experienced by the balloon module 110 and the sail module 120 in the atmosphere to induce lift at the sail module 120 and therefore the balloon module 110; and maintain a target altitude of the system 100 during a flight operation without the need of venting gas or dropping ballast at the balloon module 110.

4.1 Target Wind Shear

During ascent of an object in lighter-than-air travel into the atmosphere, the object will experience varying relative wind velocity until it reaches a maximum wind velocity (e.g., similar absolute wind velocity between the balloon module 110 and the sail module 120, zero velocity relative to each other)—such as during ascent through the jet streamafter which relative wind velocity experienced by the object will begin to decrease. Accordingly, the wind velocity gradient between the balloon module 110 and the sail module 120 will vary (e.g., increase, decrease) as the system 100 navigates in altitude during a flight operation. A net velocity difference between the balloon module 110 and the sail module 120 will result in aerodynamic lift of the system 100 via the sail module 120. However, during absence of a net velocity difference (i.e., the balloon module 110 and the sail module 120 experience the same absolute velocity), the sail module 120 is not capable of inducing aerodynamic lift into the system 100.

In one implementation, in response to detecting net-zero velocity gradient between the balloon module 110 and the sail module 120, the system 100 can: trigger the balloon module 110 to drop ballast (e.g., dropping ballast material 136 from the container 132) to reduce altitude of the balloon module 110—and therefore the sail module 120—to induce a non-zero velocity gradient between the balloon module 110 and the sail module 120; and, in response to detecting the non-zero velocity gradient, trigger the first motorized spool 126 to modify a pitch angle of the control surface 122, thereby inducing aerodynamic lift at the sail module 120.

In another implementation, the system 100 includes the tether: coupled to a winch mechanism at the sail module 120; and configured to adjust (e.g., retract, slack) the tether coupling the balloon module 110 and the sail module 120 to induce a non-zero wind velocity gradient between the balloon module 110 and the sail module 120. Accordingly, in response to detecting a net-zero velocity gradient between the balloon module 110 and the sail module 120, the system 100 can: trigger the winch mechanism to slack the tether between the balloon module 110 and the sail module 120 to increase the offset distance between the balloon module 110 and the sail module 120; induce a non-zero wind velocity gradient at the system 100 resulting from the increased offset distance between the balloon module 110 and the sail module 120; and, in response to detecting the non-zero velocity gradient, trigger the first motorized spool 126 to modify a pitch angle of the control surface 122 thereby inducing aerodynamic lift at the sail module 120.

Therefore, the system 100 can: detect a net-zero wind velocity gradient between the balloon module 110 and the sail module 120; in response to detecting the net-zero wind velocity gradient, modify (e.g., increase, decrease) altitude of the system 100 to generate a non-zero velocity gradient between the balloon module 110 and the sail module 120; and induce aerodynamic lift at the sail module 120 of the system 100.

4.2 Tensile Forces

In one implementation, the system 100 can include: a first force sensor 154 (e.g., load cell) coupled to the top anchor 150 of the balloon module 110; and a second force sensor (e.g., load cell) coupled to the bottom anchor 152 of the ballast module 130. In this implementation, the system 100 can: read force values from the first force sensor 154 and the second force sensor; calculate a tensile force difference—resulting from wind shear—between the balloon module 110 and the sail module 120; and, in response to calculating a non-zero tensile force difference, trigger the first motorized spool 126 to wind the first sail control cable 145 to change a pitch angle of the control surface 122, to increase aerodynamic forces across the control surface 122, and to adjust altitude of the sail module 120 and the balloon module 110.

In one example, the deployment cable 164: includes a first end coupled to the top anchor 150 of the balloon module 110; includes a second end coupled to the bottom anchor 152 of the ballast module 130; and is configured to locate the sail module 120 at a distance (e.g., between 250 meters and 350 meters) below the balloon module 110. In this example, the system 100 can: access a first set of force values from the first force sensor 154; access a second set of force values from the second force sensor; and calculate a tensile force difference between the balloon module 110 and the sail module 120 based on the first set of force values and the second set of force values.

The system 100 can then, in response to calculating a non-zero tensile force difference, trigger the first motorized spool 126 to wind the first sail control cable 145: to change a pitch angle of the control surface 122; to increase aerodynamic forces (e.g., positive, negative lift forces) across the control surface 122; and to adjust altitude of the balloon module 110 and the sail module 120. Alternatively, in response to calculating a net-zero tensile force difference, the system 100 can interpret a steady flight condition of the system 100; and trigger the ballast module 130 to drop ballast (e.g., sand) to transition the system 100 into an ascent flight condition.

In one variation, the system can: read a timeseries of force values from the force sensor during a flight operation; detect a target force value (e.g., maximum force value, minimum force value) in the timeseries of force values; and trigger the first motorized spool 126 to wind the first sail control cable to change a pitch angle of the control surface corresponding the target force value.

Therefore, the system 100 can: calculate tensile force differences between the balloon module 110 and the sail module 120 resulting from relative wind velocities at the balloon module 110 and the sail module 120; and, in response to calculating a non-zero tensile force difference, trigger the first motorized spool 126 to wind the first sail control cable 145 to change a pitch angle of the control surface 122, to increase aerodynamic forces across the control surface 122, and to adjust altitude of the sail module 120 and the balloon module 110.

4.3 Flight Controller

In one implementation, the system 100 includes: a first motorized spool 126 (e.g., servo motor) coupled to the control surface 122 and configured to modify (e.g., increase, decrease) an angle of attack of wind velocity relative the control surface 122 (or "pitch") and/or modify angle of attack of the sail module 120 to induce lift of the sail module 120; and a flight controller (e.g., a local computer system coupled to the sail module 120) configured to trigger the first motorized spool 126 to modify pitch of the control surface 122 responsive to altitude control prompts received, retrieved by the flight controller, and/or calculated onboard the sail module 120 . . . . In this implementation, the system 100 includes the flight controller coupled to the control surface 122 in communication with a second flight controller coupled to the balloon module 110, such as via wireless communication (e.g., radio communications), independent wireless communication (e.g., satellite communication), and/or wired communication (e.g., via cable extending along the tether).

In one example, the system 100: includes the first motorized spool 126 coupled to the trailing edge of the control surface 122 (e.g., at the nose); and is configured to induce lift at the sail module 120 by modifying a pitch angle of the leading edge of the control surface 122. In another example, the system 100: includes the first motorized spool 126 coupled to a set of elevators arranged at a trailing end of the control surface 122; and is configured to induce lift at the sail module 120 by modifying pitch angles of the set of elevators on the control surface 122. In another example, the system 100 includes the tether: coupled to a first mounting location proximal to a leading edge of the control surface 122; and coupled to a second mounting location, opposite the first mounting location, proximal to a trailing edge of the control surface 122. In this example, the system 100 can modify lengths of the tether relative to the first mounting location and the second mounting location to modify pitch—and therefore induce aerodynamic lift—at the sail module 120. The system 100 can thus: receive an altitude control prompt indicating a target altitude (e.g., 10000 meters) at the flight controller, such as from a remote computer system associated with an operator in communication with the flight controller and/or a wireless input device (e.g., game pad, keyboard) coupled to the flight controller; and, in response to receiving the altitude control prompt, initiate an altitude control cycle to: 1) trigger the first motorized spool 126 to modify (e.g., increase, decrease) a pitch angle of the control surface 122 according to the altitude control prompt; and 2) induce lift of the sail module 120—and therefore the overall system 100—toward the target altitude.

5. Altitude Control

Generally, as shown in FIGS. 5, 6, and 7, the system 100 can: detect a current altitude for the balloon module 110 deviating from a target altitude in the atmosphere; and initiate altitude control cycles to trigger the first motorized spool 126 to modify pitch angles of the sail module 120 to induce aerodynamic lift (e.g., positive, negative lift) into the system 100 and maneuver the balloon module 110 toward the target altitude. In particular, the system 100 can: interpret a wind shear velocity between the balloon module 110 and the sail module 120 of the system 100; and extract work from the wind shear velocity acting on the system 100 by modifying a pitch angle of the control surface 122 of the sail module 120 to induce additional aerodynamic lift onto the system 100 to maintain a target altitude during a flight operation. Thus, the system 100 can, initiate an altitude control cycle to: conserve ballast at the balloon module 110 by generating aerodynamic lift for the system 100 at the sail module 120; and maintain target altitude during a flight operation.

5.1 Ad-Hoc Altitude Control

In one implementation, a remote computer system can: present (e.g., at a display screen) a current location (e.g., global positioning coordinates) of the system 100 to a local operator, such as based on data retrieved from a global positioning unit coupled to the balloon module 110 and/or sail module; generate an altitude control prompt indicating a target altitude for the system 100, such as based on inputs received at the remote computer system from the local operator; and transmit—in real time—the altitude control prompt to the system 100. Thus, the system 100 can then, in response to receiving the altitude control prompt, execute an altitude control cycle to achieve the target altitude indicated in the altitude control prompt by: triggering the first motorized spool 126 to modify (e.g., increase, decrease) a pitch of the sail module 120; and induce lift by extracting work from a wind velocity gradient at the sail module 120 to increase altitude of the system 100 toward the target altitude.

5.2 Minimum/Maximum Altitude Control

In one implementation, the system 100 can: access a flight plan (e.g., from internal memory or from a remote computer system) specifying a minimum altitude for the system 100 during a flight operation; and autonomously execute an altitude control cycle in response to detecting the system 100 falling below the minimum altitude specified in the flight plan to maintain the system 100 above the minimum altitude.

For example, the system 100 can: access a flight plan from a remote computer system indicating a target minimum altitude (e.g., 10,000 meters) for the balloon module 110 of the system 100; at a first time, read a first location (e.g., lateral, longitudinal, and altitude) coordinate for the balloon module 110 from a first position module coupled to the balloon module 110; and detect a first altitude at the first location falling below the minimum target altitude. The system 100 can then, in response to the first altitude falling below the minimum target altitude, initiate an altitude control cycle to: as described above, detect a wind shear velocity between the balloon module 110 and the sail module 120 exceeding a target wind shear velocity; and increase a pitch angle of the control surface 122 on the sail module 120 to induce additional aerodynamic lift at the sail module 120—and therefore the balloon module 110—to lift the system 100 toward the minimum target altitude.

Therefore, the system 100 can: routinely execute altitude control cycles to maintain the system 100 above a minimum target altitude; and conserve lifting gas 114 and ballast operations at the balloon module 110 while achieving the minimum target altitude.

5.3 Flight Controls: Maintaining Target Altitude

In one implementation, the system 100 can: access a flight plan (e.g., from internal memory or from a remote computer system) specifying a target altitude for the system 100 during a flight operation; and autonomously execute an altitude control cycle in response to detecting the system 100 deviating from (e.g., exceeding, or falling below) the target altitude specified in the flight plan to maintain the system 100 at the target altitude.

In one example, the system 100 can: access a flight plan from a remote computer system indicating a target altitude (e.g., 10000 meters) for the balloon module 110 of the system 100; at a first time, read a first location (e.g., lateral, longitudinal, and altitude) coordinate for the balloon module 110 from a first position module coupled to the balloon module 110; and detect a first altitude at the first location falling below the target altitude. The system 100 can then, in response to the first altitude (e.g., 9000 meters) falling below the minimum target altitude, initiate a first altitude control cycle to: as described above, detect a first wind shear velocity between the balloon module 110 and the sail module 120 exceeding a target wind shear velocity; and increase a pitch angle of the control surface 122 on the sail module 120 to induce additional aerodynamic lift at the sail module 120—and therefore the balloon module 110—to lift the system 100 toward the target altitude.

In the aforementioned example, the system 100 can then: at a second time following the first time, read a second location (e.g., lateral, longitudinal, and altitude) coordinate for the balloon module 110 from the first position module; and detect a second altitude (e.g., 11000 meters) at the second location exceeding the target latitude. The system 100 can then, in response to the second altitude exceeding the target altitude, initiate a second altitude control cycle to: detect a second wind shear velocity between the balloon module 110 and the sail module 120 exceeding the target wind shear velocity; and attenuate (or "decrease") a pitch angle of the control surface 122 on the sail module 120 to reduce aerodynamic lift generated by the sail module 120 to decrease altitude of the system 100 toward the target altitude.

Therefore, the system 100 can: routinely execute altitude control cycles to maintain the system 100 at a target altitude by modifying (e.g., increasing, attenuating) pitch angles of the control surface 122 at the sail module 120; and conserve lifting gas 114 and ballast at the balloon module 110 while maintaining the target altitude during the flight operation.

5.4 Flight Controls: Maximum Wind Velocity Gradient

In one implementation, the system 100 can: access a weather model (e.g., from internal memory or from a remote computer system) specifying predicted variations in wind speed as a function of altitude for a particular region in the atmosphere; detect a maximum wind speed difference (i.e., between the sail module 120 and balloon module 110) corresponding to a target altitude from the weather model; and autonomously execute altitude control cycles to maintain the system 100 at the target altitude for the maximum wind speed difference to induce maximum wind shear velocity—and therefore maximum potential aerodynamic lift—between the balloon module 110 and the sail module 120. Therefore, the system 100 can: routinely adjust (e.g., increase, decrease) altitude of the system 100 during a flight operation to maintain the system 100 at a maximum wind shear velocity; and conserve lifting gas 114 and ballast at the balloon module 110 while maintaining the maximum wind shear velocity experienced by the system 100.

5.5 Flight Controls: Planned Flight Navigation

In another implementation, the system 100 can: access a flight plan (e.g., from internal memory or from a remote computer system) specifying a target path (e.g., latitude and longitude coordinate path) along a target region in the atmosphere; access a weather model (e.g., from internal memory or from a remote computer system) specifying predicted variations in wind speed as a function of altitude for the target region in the atmosphere; detect deviations of the system 100 from the target flight path; and execute altitude control cycles to adjust (e.g., increase, decrease) altitude of the system 100 to a target altitude corresponding to maintaining trajectory along the target flight path based on the weather model. Therefore, the system 100 can: routinely adjust (e.g., increase, decrease) altitude of the system 100 during a flight operation to maintain the system 100 along a target path; and conserve lifting gas 114 and ballast at the balloon module 110 while maintaining the target path of the system 100.

Therefore, the system 100 can: routinely execute flight control cycles to maintain the system 100 in a target flight direction and/or maneuver the system 100 according to a target path; and reduce reliance on dropping ballast and/or consuming fuel during a flight operation to maintain a target flight direction.

Although the system 100 includes an upper sail module 170 and a lower sail module 120, it should be understood that in certain implementations the upper sail module 170 and the lower sail module 120 are symmetric aerodynamic structures which can be implemented interchangeably. Additionally, it should be understood, the system 100 can include multiple (e.g., more than two) combinations of sail modules and balloon module 110s operating in a passive configuration (e.g., without sensors, controls) and/or active configuration during a flight operation.

5.6 Single Payload+Altitude Control

In one implementation, the system 100 can access a first altitude of the first sail module 120 from the first set of payload instruments 124 at a first time. The system 100 can then, in response to the first altitude exceeding a maximum altitude, trigger the first motorized spool 126 to wind the first sail control cable 145 in a first direction: to change a pitch angle of the first control surface 122 downward about the leading edge; to generate negative aerodynamic lift forces across the first control surface 122; and to decrease altitude of the balloon module 110 and the first sail module 120 without venting the lifting gas 114 from the balloon module 110.

The system 100 can then, at a second time, access a second altitude of the first sail module 120 from the first set of payload instruments 124. Accordingly, in response to the second altitude falling below a minimum altitude, the system 100 can then trigger the first motorized spool 126 to wind the first sail control cable 145 in a second direction, opposite the first direction: to change a pitch angle of the first control surface 122 upward; to increase aerodynamic lift forces across the first control surface 122; and to increase altitude of the balloon module 110 and the first sail module 120 without dropping ballast material 136 from the ballast module 130.

In another implementation, the system 100 can access a first altitude of the first sail module 120 from the first set of payload instruments 124 at a first time. The system 100 can then, in response to the first altitude exceeding a maximum altitude, trigger the first motorized spool 126 to wind the first sail control cable 145 in a first direction: to change a pitch angle of the first control surface 122 downward from a nominal plane; to negative aerodynamic lift forces across the first control surface 122; and to decrease altitude of the balloon module 110 and the sail module 120.

The system 100 can then, at a second time following the first time, access a second altitude of the first sail module 120 from the first set of payload instruments 124. Accordingly, in response to the second altitude approximating the maximum altitude, the system 100 can then trigger the first motorized spool 126 to wind the first sail control cable 145 in a second direction, opposite the first direction: to change a pitch angle of the first control surface 122 upward to the nominal plane; to generate net-zero aerodynamic forces across the first control surface 122; and to maintain the balloon module 110 and the sail module 120 at the maximum altitude.

Therefore, the system 100 can routinely execute altitude control cycles to periodically upwardly shift and downwardly shift the control surface 122 to maintain the system 100 within a target altitude range.

5.7 Flight Controls: Balloon Module Payload+Sail Module Payload

In one implementation, the system 100 can: access a first relative wind velocity at the first sail module 120 from the first set of payload instruments 124; access a second relative wind velocity at the balloon module 110 from the second set of payload instruments 174; and calculate a wind shear velocity between the balloon module 110 and the first sail module 120 based on the first relative wind velocity and the second relative wind velocity. Accordingly, in response to the wind shear velocity exceeding a threshold wind shear velocity, the system 100 can trigger the first motorized spool 126 to wind the first sail control cable 145: to change a pitch angle of the first control surface 122 about the leading edge; to increase aerodynamic forces across the first control surface 122; and to adjust altitude of the balloon module 110 and the first sail module 120.

5.8 Rate of Ascent

In one implementation, the system 100 can access a first altitude of the first sail module 120 from the first set of payload instruments 124 at a first time. The system 100 can then, in response to the first altitude exceeding a maximum altitude, trigger the first motorized spool 126 to wind the first sail control cable 145 in a first direction to change a pitch angle of the first control surface 122 downward at a first angle of attack. Additionally, at a second time following the first time, the system 100 can then access a first rate of descent of the first sail module 120 from the first set of payload instruments 124. In response to the first rate of descent approximating a zero rate of descent, the system 100 can then trigger the first motorized spool 126 to wind the first sail control cable 145 in the first direction: to change a pitch angle of the first control surface 122 downward at a second angle of attack greater than (or less than) the first angle of attack; to generate aerodynamic lift in a downward direction across the first control surface 122; and to decrease altitude of the balloon module 110 and the first sail module 120.

In another implementation, the system 100 can access a first altitude of the lower sail module 120 from the first set of payload instruments 124. Additionally, in response to the first altitude falling below a minimum altitude, the system 100 can then: trigger the first motorized spool 126 to wind the first sail control cable 145, sweeping a pitch of the first control surface 122 from a nominal orientation to a maximum angle of attack about the first leading edge; during sweeping of the pitch of the first control surface 122, access a sequence of rate of ascent values from the first set of payload instruments 124; detect a target rate of ascent value in the sequence of rate of ascent values; and, in response to detecting the target rate of ascent value, trigger the first motorized spool 126 to wind the first sail control cable 145 to change a pitch angle of the first control surface 122 at a first angle of attack corresponding to the target rate of ascent value.

Therefore, the system 100 can maintain the control surface 122 of the sail module 120 pitched at a target angle of attack in order to maintain a target rate of ascent toward a target altitude.

5.9 Dropping Ballast

In one implementation, the system 100 can access a first altitude of the first sail module 120 from the first set of payload instruments 124 at a first time. In response to the first altitude falling below a minimum altitude, the system 100 can then trigger the first motorized spool 126 to wind the first sail control cable 145: to change a pitch angle of the first control surface 122 upwardly; to increase aerodynamic lift forces across the first control surface 122; and to increase altitude of the balloon module 110 and the first sail module 120. Furthermore, at a second time following the first time, the system 100 can access a second altitude of the first sail module 120 from the first set of payload instruments 124. Accordingly, in response to the second altitude falling below the minimum altitude, the system 100 can trigger the valve to release ballast material 136 from the container 132, increasing aerostatic lift to increase altitude of the balloon module 110 and the first sail module 120.

Therefore, the system 100 can drop ballast to induce net aerostatic lift at the balloon module 110 in the event that the sail module 120 is unable to generate sufficient aerodynamic lift force to ascend the system 100 toward the target altitude.

6. Intermediate Sail

Figure 10:
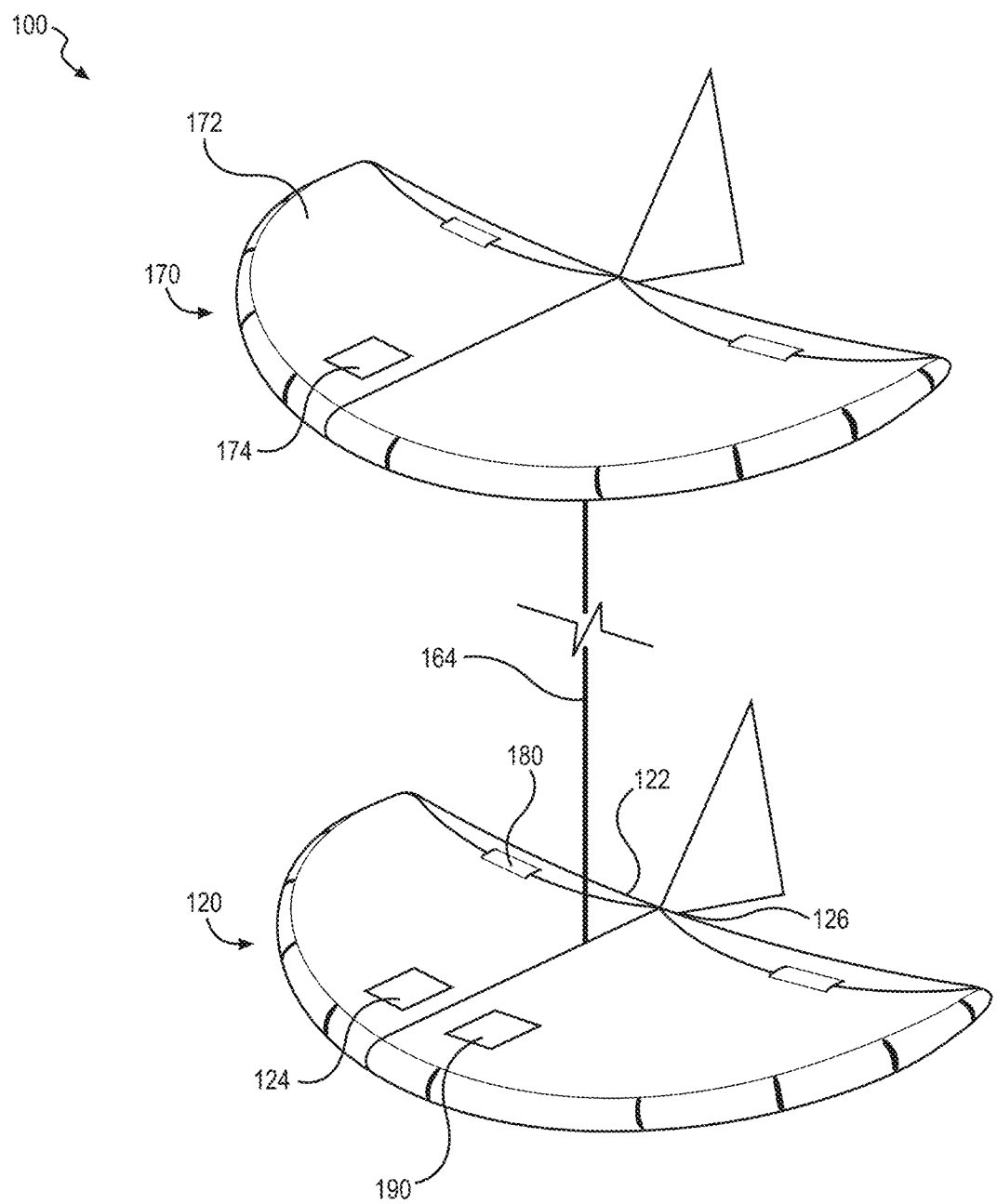
FIG. 10 is a schematic representation of the system.
Figure 11:
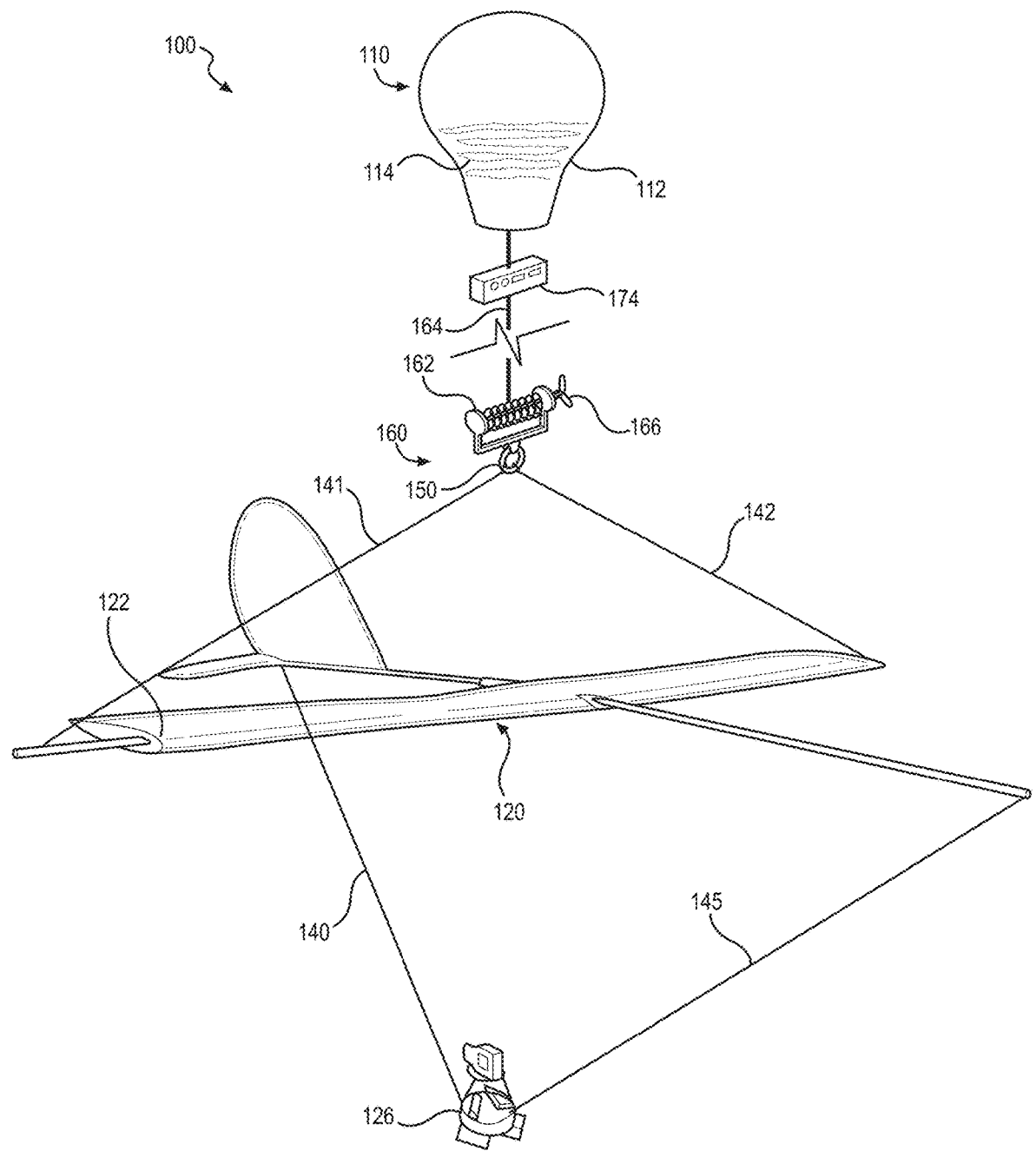
FIG. 11 is a schematic representation of the system.

In one implementation, as shown in FIGS. 3, 6, and 10, the system 100 can include a second sail module 170 (or intermediate sail module): interposed between the balloon module 110 and the first sail module 120; including a second control surface 172 defining a leading edge and a trailing edge; and including a second motorized spool 176 arranged at the trailing edge of the second control surface 172. In this implementation, the second sail module 170 cooperates with the first sail module 120 to generate aerodynamic forces (e.g., positive, negative lift forces) to adjust altitude of the system 100 during an altitude control cycle. Additionally, the second sail module 170 can include a flight controller, as described above, configured to communicate (e.g., wirelessly) with flight controllers at the balloon module and/or the first sail module 120.

The system 100 can further include a second bridle assembly 147, as described above, including: a second set of fixed sail cables coupling the balloon module 110 to the leading edge of the second control surface 172; and a second set of sail control cables wound about the second motorized spool 176 at the trailing edge of the second control surface 172 and cooperating with the set of fixed sail cables to locate the second sail module 170 interposed between the balloon module 110 and the first sail module 120.

In particular, the second set of fixed sail cables can include a third fixed sail cable 143: defining a third length (e.g., one meter); and coupling the balloon module 110 to a first section of the leading edge of the second control surface 172. Additionally, the second set of fixed sail cables can include a fourth fixed sail cable 144: defining a fourth length (e.g., one meter), approximating the third length; and coupling the balloon module 110 to a second section, adjacent the first section, of the leading edge of the second control surface 172. The second set of sail control cables can include a second sail control cable 146: wound about the second motorized spool 176 at the trailing edge of the second control surface 172; coupling the balloon module 110 to the trailing edge of the second control surface 172; and cooperating with the third fixed sail cable 143 and the second fixed sail cable 142 to locate the second sail module 170 interposed between the balloon module 110 and the first sail module 120.

Accordingly, the system 100 can trigger the second motorized spool 176 to wind the second sail control cable 146: to change a pitch angle of the second control surface 172; to increase aerodynamic forces (e.g., positive, negative lift forces) across the second control surface 172; and to adjust altitude of the balloon module 110, the first sail module 120, and the second sail module 170.

Therefore, during an altitude control cycle, the system 100 can concurrently or sequentially trigger the first motorized spool 126 to wind the first sail control cable 145 and the second motorized spool 176 to wind the second sail control cable 146: to pitch the first control surface 122 and the second control surface 172; to increase aerodynamic forces (e.g., positive, negative lift forces) across the first control surface 122 and the second control surface 172; and to adjust altitude of the balloon module 110, the first sail module 120, and the second sail module 170.

In another implementation, the intermediate sail module 170 (or any sail module) can define an aerodynamic anchor (e.g., parachute) configured to stabilize position of the aircraft system 100 relative to wind at a target altitude.

6.1 Flight Controls: Intermediate Sail

In another implementation, the system 100 can access a first altitude of the balloon module 110 from the second set of payload instruments 174 at a first time. Additionally, in response to the first altitude exceeding a threshold altitude, the system 100 can then: access a first relative wind velocity of the first sail module 120 from the first set of payload instruments 124; access a second relative wind velocity at the balloon module 110 from the second set of payload instruments 174; and calculate a first wind shear velocity between the balloon module 110 and the first sail module 120 based on the first relative wind velocity and the second relative wind velocity. Thus, in response to the first wind shear velocity approximating a net-zero wind shear velocity, the system 100 can trigger the second motorized spool 176 to wind a second sail control cable 146 of an intermediate sail module: to change a pitch angle of the second control surface 172 of the intermediate sail; to generate negative aerodynamic lift forces across the second control surface 172; and to decrease altitude of the balloon module 110, the first sail module 120, and the second sail module 170.

7. Dual Sail Module

Generally, as shown in FIGS. 3, 8 and 10, a variation of the system 100 can include: an upper sail module 170 (e.g., planar sail); and a lower sail module 120 (e.g., planar sail) coupled (e.g., tethered) to the upper sail module 170 and cooperating with the upper sail module 170 in order to extract work from a wind velocity gradient (i.e., between the upper sail module 170 and the lower sail module 120) to maneuver (e.g., vertically, horizontally) the system 100 toward a target direction in the atmosphere. In particular, the upper sail module 170 includes a second control surface 172 (e.g., lighter-than-air, heavier-than-air) configured to induce a first aerodynamic force component for the system 100 resulting from relative wind flow across the second control surface 172. Additionally, the lower sail module 120 includes a first control surface 122 (e.g., lighter-than-air, heavier-than-air): coupled (e.g., tethered) below the upper sail module 170 at a target offset distance (e.g., 500-1000 meters) to induce wind shear between the upper sail module 170 and the lower sail module 120; and configured to induce a second aerodynamic force component, different from the first aerodynamic force component, for the system 100 resulting from relative wind flow across the first control surface 122. Thus, the system 100 can maneuver (e.g., vertically, horizontally) in a target direction resulting from a combination of the first aerodynamic force component and the second aerodynamic force component by manipulating control surfaces (e.g., ailerons, elevators, rudders) across the second control surface 172 and the first control surface 122.

7.1 Upper Sail Module

In one implementation, the system 100 includes an upper sail module 170: defining a substantially horizontal plane (e.g., xy-plane) relative a first flight axis; and including a set of control surfaces arranged across the upper sail module 170 configured to enable the upper sail module 170 to maneuver within three degrees-of-freedom (e.g., pitch, yaw, and roll) relative the first flight axis in order to steer (e.g., horizontally) the upper sail module 170 in a target direction during a flight operation. In particular, the sail module 120 includes a second control surface 172 defining: a leading edge configured to distribute wind speed across surfaces (e.g., top surface, bottom surface) of the second control surface 172; a trailing edge arranged opposite the leading edge; and a chord line extending from the leading edge toward the trailing edge of the second control surface 172 and cooperating with the leading edge and the trailing edge to distribute pressure-resulting from air flow-across the top surface and bottom surface of the second control surface 172 to induce an aerodynamic force (e.g., positive, negative lifting force) on the second control surface 172 and therefore the overall (i.e., the upper sail module 170 and the lower sail module 120) system 100.

In one example, the upper sail module 170 includes a set of control surfaces including: a set of ailerons arranged along the trailing edge of the second control surface 172 configured to manipulate roll of the second control surface 172 relative the first flight axis; a rudder extending orthogonal from the control surface 122 configured to manipulate yaw of the second control surface 172 relative the first flight axis; and a set of elevators coupled to the rudder and configured to manipulate pitch of the second control surface 172 relative the first flight axis. In this example, the upper sail module 170 further includes a flight controller configured to manipulate (e.g., pitch, rotate) the set of ailerons, rudder, and the set of elevators across the upper sail module 170, and thus enables the upper sail module 170 to extract work resulting from air flow across the set of control surfaces in order to manipulate orientation of the upper sail module 170 within three degrees-of-freedom in the atmosphere during a flight operation. In another example, the control surface 122 includes a unitary inflatable element 112 configured to contain a lifting gas 114 inducing aerostatic lift of the unitary inflatable element 112.

Additionally, the upper sail module 170 can further include: a first anemometer (e.g., 3D wind measuring instrument, angle of attack sensor) coupled to the second control surface 172 and configured to output a magnitude and direction of wind speed relative the second control surface 172; and a first positioning sensor (e.g., global positioning module, inertial measurement modules) coupled to the second control surface 172 configured to output positional values. The flight controller can then: detect a first magnitude and a first direction of a first wind speed relative the second control surface 172; detect a first set of electrical values from the first positioning sensor arranged on the second control surface 172; and interpret a first orientation of the upper sail module 170 relative the first flight axis based on the first set of electrical values. Accordingly, the flight controller can: interpret a first aerodynamic force component (e.g., positive, negative lift) applied to the upper sail module 170 based on the first magnitude and first direction of the first wind speed and the first orientation of the upper sail module 170; and, in response to the first orientation deviating from a target orientation, manipulate the set of control surfaces (e.g., ailerons, rudder) across the upper sail module 170 in order to extract work from the first aerodynamic force component on the second control surface 172 and thus maneuver the upper sail module 170 into a target direction.

7.2 Lower Sail Module

In one implementation, the system 100 similarly includes a lower sail module 120: defining a substantially horizontal plane (e.g., xy-plane) relative to a second flight axis; and including a set of control surfaces arranged across the lower sail module 120 configured to enable the lower sail module 120 to maneuver within three degrees-of-freedom (e.g., pitch, yaw, and roll) relative the second flight axis in order to steer (e.g., horizontally) the upper sail module 170 in a target direction during a flight operation. In this implementation, the lower sail module 120 further includes a tether (e.g., a paracord): coupling the first control surface 122, such as at a central strut of the first control surface 122, to the second control surface 172 of the upper sail module 170; and defining a target offset distance (e.g., 200, 300 meters) between the upper sail module 170 and the lower sail module 120 in order to induce a wind velocity gradient across the system 100 during a flight operation, as described above. Additionally, as described above, the lower sail module can include an anemometer sensor and positioning sensor.

As described above, the lower sail module 120 may experience a relative wind velocity different from a relative wind velocity for the upper sail module 170, which results in a wind velocity gradient between the upper sail module 170 and the lower sail module 120. Accordingly, the system 100 can: manipulate control surfaces across the upper sail module 170 and the lower sail module 120 to extract work from the wind velocity gradient between the upper sail module 170 and the lower sail module 120; and maneuver (e.g., horizontally) the upper sail module 170 and the lower sail module 120 as a unitary body during a flight operation according to resultant aerodynamic forces generated at the upper sail module 170 and the lower sail module 120.

7.3 Bridle Assembly

In one implementation, the system 100 includes a bridle assembly 140 including: a set of fixed sail cables coupling the upper sail module 170 to the leading edge of the first control surface 122 of the lower sail module 120; and a second set of sail control cables wound about the first motorized spool 126 at the trailing edge of the first control surface 122 of the lower sail module 120 and cooperating with the set of fixed sail cables to locate the lower sail module 120 at a distance below the upper sail module 170. In this implementation, the system 100 can include: a top anchor 150 (e.g., carabiner) arranged (e.g., tethered) below the first control surface 122 of the upper sail module 170; and a bottom anchor 152 (e.g., carabiner) arranged at a top end of the container 132 of the ballast module 130 arranged below the lower sail module 120. Accordingly, the set of fixed sail cables and the set of sail control cables are coupled to the top anchor 150 and the bottom anchor 152, thus locating the lower sail module 120 interposed between the upper sail module 170 and the ballast module 130. Additionally, the set of fixed sail cables and the set of sail control cables cooperates with the ballast module 130 to stabilize and maintain the first control surface 122 of the lower sail module 120 within a nominal plane (e.g., parallel to a ground surface).

In one example, the set of fixed sail cables can include a first fixed sail cable 141: defining a first length (e.g., one meter); including a first end coupled to the top anchor 150 of the upper sail module 170; and including a second end coupled to the bottom anchor 152 of the ballast module 130. The first fixed sail cable 141 couples the first section (e.g., first wing section) of the leading edge of the first control surface 122 of the lower sail module 120 interposed between the first end and the second end of the first fixed sail cable 141. The set of fixed sail cables can further include a second fixed sail cable 142: defining a second length approximating the first length (e.g., one meter); including a first end coupled to the top anchor 150 of the upper sail module 170; and including a second end coupled to the bottom anchor 152 of the ballast module 130. The second fixed sail cable 142 couples the second section (e.g., second wing section), adjacent the first section, of the first leading edge of the first control surface 122 of the lower sail module 120 interposed between the first end and the second end of the second fixed sail cable 142.

In this example, the lower sail module 120 includes a first motorized spool 126: arranged at the trailing edge of the first control surface 122; and including a first spool section and a lower spool section, adjacent the first spool section. The set of sail control cables includes a first sail control cable 145 including: a first end coupled to the top anchor 150 of the upper sail module 170; and a second end wound about the first spool section of the first motorized spool 126 in a first direction to define a third length (e.g., 0.5 meters) from the upper sail module 170. Additionally, the set of sail control cables can include a second sail control cable 146: including a first end coupled to the bottom anchor 152 of the ballast module 130; including a second end wound about the second spool section of the first motorized spool 126 in a second direction, opposite the first direction, to define a fourth length-approximating the third length (e.g., 0.5 meters)— from the ballast module 130; and cooperating with the first sail control cable 145 to define a total cable length approximating the first length and the second length (e.g., one meter) of the first fixed sail cable 141 and the second fixed sail cable 142.

Accordingly, the set of fixed sail cables cooperates with the set of sail control cables to form a triangular cable frame: enclosing the first control surface 122 of the lower sail module 120; and locating the lower sail module 120 interposed between the upper sail module 170 and the ballast module 130.

The controller 190 can then trigger the first motorized spool 126 to wind the first sail control cable 145 and the second sail control cable 146: to change a pitch angle of the first control surface 122; to increase aerodynamic forces (e.g., positive, negative lift forces) across the first control surface 122; and to adjust (e.g., increase, decrease) altitude of the upper sail module 170 and the lower sail module 120. More specifically, the controller 190 can trigger the first motorized spool 126 to wind the first sail control cable 145 and the second sail control cable 146 in a first direction, resulting in: increase of the third length (e.g., 0.7 meters) of the first sail control cable 145 from the upper sail module 170; and decrease of the fourth length (e.g., 0.3 meters) of the second sail control cable 146 from the ballast module 130 to downwardly pitch the first control surface 122 about the leading edge while maintaining approximation to the first length and the second length (e.g., one meter) of the first fixed sail cable 141 and the second fixed sail cable 142.

Similarly, the controller 190 can trigger the first motorized spool 126 to wind the first sail control cable 145 and the second sail control cable 146 in a second direction opposite the first direction, resulting in: decrease of the third length (e.g., 0.3 meters) of the first sail control cable 145 from the upper sail module 170; and increase of the fourth length (e.g., 0.7 meters) of the second sail control cable 146 from the ballast module 130 to upwardly pitch the first control surface 122 about the leading edge while maintaining approximation to the first length and the second length (e.g., one meter) of the first fixed sail cable 141 and the second fixed sail cable 142.

Therefore, the bridle assembly 140: functions as a stabilizer cooperating with the ballast module 130 to maintain the first control surface 122 of the lower sail module 120 in a nominal planar configuration; and defines a pitch axis about the leading edge of the control surface 122. In other variations, the bridle assembly 140 can include any number of combinations of fixed sail cables and sail control cables coupling the lower sail module 120 to the upper sail module 170.

7.4 Control Surface Orientation

In one implementation, the lower sail module 120 can include a first control surface 122 defining: a leading edge; a trailing edge; a first wingtip; and a second wingtip, opposite the first wingtip. In this implementation, the lower sail module 120 can further include: a first motorized spool 126 arranged at the trailing edge of the first control surface 122; a second motorized spool 176 arranged at the first wingtip of the first control surface 122; and a third motorized spool arranged at the second wingtip of the first control surface 122. Furthermore, the bridle assembly 140 can include a second sail control cable 146: wound about the second motorized spool 176 at the first wingtip of the first control surface 122; and coupling the upper sail module 170 to the first wingtip of the first control surface 122. Additionally, the bridle assembly 140 can further include a third sail control cable: wound about the third motorized spool at the second wingtip of the first control surface 122; and coupling the upper sail module 170 to the second wingtip of the first control surface 122.

In this implementation, the system 100 can trigger the first motorized spool 126 to wind the first sail control cable 145, thus changing a pitch angle of the first control surface 122 about the leading edge. Additionally, the system 100 can trigger the second motorized spool 176 to wind the second sail control cable 146 and the third motorized spool to wind the third sail control cable, thus rolling the first control surface 122 about the central strut.

Therefore, the system 100 can include a bridle assembly 140 coupled to a set of motorized spools across the first control surface 122 of the lower sail module 120 to define: a pitch axis about the leading edge of the first control surface 122; and a roll axis about a central strut of the first control surface 122, thereby enabling local orientation of the first control surface 122 of the lower sail module 120 within two degrees of freedom.

7.5 Actuators+Single Connection

In one variation, the system can include: an upper sail module 170; a lower sail module 120; and a deployment module 160 coupling the upper sail module 120 to the lower sail module. In this implementation, as described above, the lower sail module can include: a set of control surfaces (e.g., elevators, ailerons, rudders); and a set of actuators (e.g., servo motors) coupled to these set of control surfaces and configured to modify position (e.g., pitch) of these control surfaces to generate aerodynamic force (e.g., positive lift, negative lift) at the lower sail module thus, adjusting altitude of the lower sail module 120 and the upper sail module 170. Similarly, the upper sail module 170 can also include this configuration of control surfaces and actuators.

Additionally, in this variation, the deployment module 160 can include: a deployment spool 162 interposed between the upper sail module 170 and the lower sail module 180; and a deployment cable 164 wound about the deployment spool 164 and coupling the upper sail module 170 to the lower sail module 120. In one example of this variation, the system 100 can include: the deployment module 160 arranged below the upper sail module 170; and the deployment cable 164 including a first end coupled to a center of the lower sail module 120 and a second end wound about the deployment module 160.

Therefore, rather than triggering a motorized spool as described above and below, the system 100 can: initiate an altitude control cycle; and trigger an actuator to modify orientation (e.g., modify pitch) of a control surface (e.g., elevator) to generate aerodynamic force (e.g., positive lift, negative lift) across the sail module (i.e., lower sail module 120, upper sail module 170) to adjust altitude of the system. Other variations of the system 100 can include combinations of motorized spools and wing actuators in order to modify orientation of the sail modules (i.e., lower sail module 120, upper sail module 170).

7.6 Deployment: Dual Sail

In one implementation, the system 100 includes an upper sail module 170 defining a unitary inflatable element 112 formed of an inflatable material (e.g., rubber, latex, silicone) that conforms to the shape of the second control surface 172 when filled with a gaseous substance (e.g., air, helium, hydrogen) configured to induce aerostatic lift to the system 100. Accordingly, during a deployment operation, the system 100 can induce aerostatic lift at the upper sail module 170 in order to lift the upper sail module 170 into the atmosphere, and subsequently lift the lower sail module 120—tethered to the upper sail module 170—into the atmosphere.

In another implementation, the system 100 further includes an inflatable element 112: coupled to the upper sail module 170; and configured to, during a deployment operation, induce aerostatic lift into the system 100 in order to lift the upper sail module 170 and the lower sail module 120 into the atmosphere responsive to inflation of the inflatable element 112. Accordingly, the system 100 can reduce lift or release ballast (e.g., by venting gas, dropping sand) in order to decrease or increase, respectively, the altitude of the system 100. In another implementation, the system 100 can include an unmanned aerial craft (e.g., a drone, expendable balloon) configured to couple the upper and lower sail modules and carry the sail modules to a target altitude prior to deployment of the deployment module.

Additionally, the upper sail module 170 can include a winch (e.g., motorized spool, free-spinning spool, speed limited spool with passive brake) including a tether coupling the upper sail module 170 and the lower sail module 120. In this implementation, the upper sail module 170 and the lower sail module 120 are initially coupled at a first target offset distance (e.g., less than one meter). Subsequently, once deployed the robotic system can trigger the winch to unwind the tether in order to locate the upper sail module 170 to a second target offset distance (e.g., 200-300 meters).

Similarly, as described above, the system 100 further includes a deployment module 160: coupling the upper sail module 170 to the lower sail module 120; and configured to, during a deployment period, locate the lower sail module 120 at a distance (e.g., between 500 and 1000 meters) below the upper sail module 170. The deployment module 160 includes: a deployment spool 162, such as coupled to the control surface 122 of the sail module 120 or arranged below the upper sail module 170; a deployment cable 164 including a first end coupled to the top anchor 150 of the upper sail module 170, and a second end wound about the deployment spool 162 and coupling the sail module 120 to the balloon module 110; and a rate regulator 166 coupled to the deployment spool 162 and configured to add resistance during unwinding of the deployment spool 162.

During a deployment period, the deployment module 160 transitions from a first deployment configuration to a second deployment configuration in order to locate the lower sail module 120 at a distance below the upper sail module 170. More specifically, at an initial time during a deployment period, the deployment cable 164 is wound about the deployment spool 162 to locate the lower sail module 120 at a first distance (e.g., one meter) below the upper sail module 170. Furthermore, at a second time following the initial time, the controller 190 can then trigger the deployment spool 162—such as in response to detecting a target altitude (e.g., 5000 meters) of the lower sail module 120—to unwind the deployment cable 164 from the deployment spool 162 and thus locate the lower sail module 120 at a second distance (e.g., between 250 meters and 350 meters), greater than the first distance, from the upper sail module 170.

7.7 Flight Controls: Dual Sail

Generally, the system 100 can initiate a flight control cycle to: extract work from a wind velocity gradient between the upper sail module 170 and the lower sail module 120 by manipulating control surfaces across the upper sail module 170 and the lower sail module 120; and induce a total aerodynamic force at the system 100 toward a target flight direction during a flight operation. In particular, the system 100 can receive signals from a controller 190 (e.g., local computer arranged on the system 100, radio ground controller, satellite controller): trigger motorized spools coupled to a first set of control surfaces across the upper sail module 170 to modify orientation-such as to a target orientation maintained by aerodynamic control surfaces—of the upper sail module 170 relative the first flight axis and the first wind velocity, which also modifies the first aerodynamic force component at the upper sail module 170; trigger motorized spools coupled to a second set of control surfaces across the lower sail module 120 to modify orientation of the lower sail module 120 relative the second flight axis and the second wind velocity, which also modifies the second aerodynamic force component at the lower aerodynamic; and induce a total aerodynamic force applied to the system 100 toward a target flight direction based on the first aerodynamic force component and the second aerodynamic force component. Thus, the system 100 can routinely manipulate orientation of the upper sail module 170 relative to wind in order to navigate the system 100 toward a target flight direction during a flight operation.

In one implementation, the system 100 can: detect a first wind velocity (e.g., wind speed and direction) from a first anemometer coupled to the upper sail module 170; read a set of electrical values from a first positioning module (e.g., global positioning module, inertial measurement modules) coupled to the upper sail module 170; and interpret a first orientation of the upper sail module 170 relative the first flight axis based on the first set of electrical values from the first positioning module. Additionally, the system 100 can: read a set of electrical values from a first force sensor 154 coupled to the tether at the upper sail module 170; and interpret a tension vector (e.g., magnitude, direction) along the tether based on the set of electrical values. Accordingly, the system 100 can implement aerodynamic computational models (e.g., air flow modeling software) in order to calculate a first aerodynamic force component applied to the system 100 at the upper sail module 170 based on the first wind velocity, the first orientation of the upper sail module 170, and the tension vector along the tether.

Similarly, the system 100 can: detect a second wind velocity (e.g., wind speed and direction) from a second anemometer coupled to the lower sail module 120; read a set of electrical values from a second positioning module (e.g., global positioning module, inertial measurement modules) coupled to the lower sail module 120; and interpret a second orientation of the lower sail module 120 relative the second flight axis of the lower sail module 120 and relative the upper sail module 170. Accordingly, the system 100 can implement aerodynamic computational models (e.g., air flow modeling software) in order to calculate a second aerodynamic force component applied to the system 100 at the lower sail module 120 based on the second wind velocity, the second orientation fourth the lower sail module 120, and the tension vector along the tether.

Thus, the system 100 can then implement vector computing techniques (e.g., divergence, vector field) in order to calculate total aerodynamic force vector—representing a cruising direction of the system 100—according to a summation of the first aerodynamic force component at the upper sail module 170 and the second aerodynamic force component at the lower sail module 120.

Furthermore, in response to the total aerodynamic force deviating from a target aerodynamic force, the system 100 can initiate a flight control cycle to extract work from a wind velocity gradient—between the upper sail module 170 and the lower sail module 120—by manipulating control surfaces across the upper sail module 170 and the lower sail module 120. In particular, the system 100 can implement aviation maneuvering techniques (aircraft vectoring) to: trigger a first set of actuators coupled to control surfaces of the upper sail module 170 to modify orientation of the upper sail module 170 relative the first flight axis, which in turn modifies the first aerodynamic force component at the upper sail module 170; trigger a second set of actuators coupled to control surfaces of the lower sail module 120 to modify orientation of the lower sail module 120 relative the second flight axis, which in turn modifies the second aerodynamic force component at the lower sail module 120; and induce a second total aerodynamic force at the system 100 toward the target aerodynamic force in order to maneuver the system 100 (i.e., the upper sail module 170 and the lower sail module 120) toward a target direction.

Therefore, the system 100 can implement closed loop controls to maintain the system 100 maneuvering in a target direction by routinely manipulating control surfaces across the upper sail module 170 and the lower sail module 120 according to total aerodynamic forces applied to the system 100.

7.8 Flight Controls: Dual-Sail Module

In one implementation, the system 100 can access a first altitude of the lower sail module 120 from the first set of payload instruments 124 at a first time. The system 100 can then, in response to the first altitude exceeding a maximum altitude, trigger the first motorized spool 126 to wind the first sail control cable 145 in a first direction: to change a pitch angle of the first control surface 122 downwardly; to generate negative aerodynamic lift forces across the first control surface 122; and to decrease altitude of the balloon module 110 and the lower sail module 120.

Additionally, at a second time, the system 100 can then access a second altitude of the lower sail module 120 from the first set of payload instruments 124. The system 100 can then, in response to the second altitude falling below a minimum altitude, trigger the first motorized spool 126 to wind the first sail control cable 145 in a second direction, opposite the first direction: to change a pitch angle of the first control surface 122 upward about the first leading edge; to increase aerodynamic lift forces across the first control surface 122; and to increase altitude of the balloon module 110 and the lower sail module 120.

Therefore, rather than combining aerostatic lift forces from a balloon module 110 and aerodynamic forces from a sail module 120 to maintain a target altitude, the system 100 can leverage aerodynamic forces generated across an upper sail module 170 and a lower sail module 120 to maintain a target altitude of the system 100.

7.9 Control Surface Orientation

In one implementation, the system 100 further includes an attitude sensor (e.g., accelerometer, gyroscope): coupled to the second control surface 172 of the upper sail module 170; and configured to output an orientation of the second control surface 172. In this implementation, the system 100 can access a first altitude of the lower sail module 120 from the first set of payload instruments 124. In response to the first altitude deviating from a target altitude, the system 100 can then: access a first relative wind velocity at the upper sail module 170 from the second set of payload instruments 174; access a first orientation of the second control surface 172 from the attitude sensor; and implement vector calculation techniques to interpret a target heading of the lower sail module 120 based on the first relative wind velocity and the first orientation configured to adjust the lower sail module 120 toward the target altitude. Accordingly, based on the target heading of the lower sail module 120, the system 100 can trigger the first motorized spool 126 to wind the first sail control cable 145 in a direction according to the target heading: to change a pitch angle of the first control surface 122 about the leading edge; to increase aerodynamic forces across the first control surface 122; and to adjust altitude of the lower sail module 120 to the target altitude.

In another implementation, the system 100 can access a first altitude of the lower sail module 120 from the first set of payload instruments 124. In response to the first altitude deviating from a target altitude, the system 100 can then: access a first relative wind velocity at the lower sail module 120 from the first payload instruments; and access a target heading of the lower sail module 120 toward the target altitude; and, based on the first relative wind velocity and the target heading, interpret a first orientation of the first control surface 122 configured to generate aerodynamic forces to maneuver the lower sail module 120 toward the target altitude. Accordingly, the system 100 can trigger a set of motorized spools arranged across the control surface 122 of the lower sail module 120 to wind a set of sail control cables: to change a pitch angle of the first control surface 122 according to the first orientation; to increase aerodynamic forces across the first control surface 122; and to adjust altitude of the lower sail module 120 toward the target altitude.

Therefore, the system 100 can adjust orientation of the control surface 122 to direct the lower sail module 120 toward a target heading in order to locate the system 100 at a target altitude.

8. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
    a balloon module comprising:
        an inflatable element; and
        a volume of lifting gas arranged within the inflatable element and generating aerostatic lift;
    a first sail module defining a first edge and a second edge and comprising:
        a first control surface extending between the first edge and the second edge;
        a first set of payload instruments; and
        a first motorized spool arranged proximal the second edge of the first sail module;
    a ballast module comprising:
        a container arranged below the first sail module; and
        a ballast material arranged within the container;
    a first bridle assembly comprising:
        a first fixed sail cable:
            defining a first length; and
            coupling the balloon module to a first section of the first control surface proximal the first edge;
        a second fixed sail cable:
            defining a second length approximating the first length; and
            coupling the balloon module to a second section of the first control surface proximal the first edge; and
        a first sail control cable:
            wound about the first motorized spool;
            coupled to the balloon module; and
            cooperating with the first fixed sail cable and the second fixed sail cable to locate the first sail module at a distance below the balloon module; and
    a controller configured to trigger the first motorized spool to wind the first sail control cable:
        to change a pitch angle of the first control surface;
        to change aerodynamic forces across the first control surface; and
        to adjust an altitude of the balloon module and the first sail module.

2. The system of claim 1, wherein the controller is configured to:
    at a first time, access a first altitude of the first sail module from the first set of payload instruments;
    in response to the first altitude exceeding a first target altitude, trigger the first motorized spool to wind the first sail control cable in a first direction:
        to pitch the first control surface downward from a nominal plane;
        to generate negative aerodynamic lift across the first control surface; and
        to decrease altitude of the balloon module and the first sail module;
    at a second time following the first time, access a second altitude of the first sail module from the first set of payload instruments; and
    in response to the second altitude approximating the first target altitude, trigger the first motorized spool to wind the first sail control cable in a second direction, opposite the first direction:
        to pitch the first control surface upward to the nominal plane;
        to generate net-zero aerodynamic forces across the first control surface; and
        to maintain the balloon module and the first sail module at the first target altitude.

3. The system of claim 1, wherein the controller is configured to:
    at a first time, access a first altitude of the first sail module from the first set of payload instruments;
    in response to the first altitude exceeding a first target altitude, trigger the first motorized spool to wind the first sail control cable in a first direction:
        to pitch the first control surface downward at a first angle of attack;
        to generate negative aerodynamic lift across the first control surface; and
        to decrease altitude of the balloon module and the first sail module;
    at a second time following the first time, access a first rate of descent of the first sail module from the first set of payload instruments;
    detect a stalling condition of the first sail module in response to the first rate of descent falling below a target descent rate; and
    in response to detecting the stalling condition, trigger the first motorized spool to wind the first sail control cable in the first direction:
        to pitch the first control surface downward at a second angle of attack, greater than the first angle of attack;
        to generate negative aerodynamic lift across the first control surface; and
        to decrease altitude of the balloon module and the first sail module.

4. The system of claim 1, wherein the controller is configured to:
    at a first time, access a first altitude of the first sail module from the first set of payload instruments;
    in response to the first altitude exceeding a first target altitude, trigger the first motorized spool to wind the first sail control cable in a first direction:
        to pitch the first control surface downwardly;
        to generate negative aerodynamic lift across the first control surface; and
        to decrease altitude of the balloon module and the first sail module;
    at a second time following the first time, access a first rate of descent of the first sail module from the first set of payload instruments;
    detect a stalling condition of the first sail module in response to the first rate of descent falling below a target descent rate; and
    in response to detecting the stalling condition, trigger the valve to release ballast material from the container to increase altitude of the balloon module and the first sail module.

5. The system of claim 1, wherein the first sail module comprises:
    a central strut;
    a front wing spar:
        coupled to a proximal end of the central strut;
        defining the first edge; and
        coupled to the first fixed sail cable and the second fixed sail cable;
    a rear wing spar:
        coupled to the central strut aft of the front wing spar;
        defining the second edge; and
        supporting the first motorized spool;
    a cover spanning the front wing spar and the rear wing spar to form the first control surface; and
    a tail fin:
        coupled to a distal end of the central strut;
        arranged orthogonal to the first control surface; and
        configured to align the first edge of the first control surface aligned to a local wind direction at the first sail module.

6. The system of claim 1, wherein the inflatable element comprises a tubular structure defining:
    a circular cross-section of a diameter; and
    a length at least ten times greater than the diameter.

7. The system of claim 1:
    wherein the balloon module comprises a balloon anchor arranged proximal a bottom end of the inflatable element;
    further comprising a deployment module interposed between the balloon module and the first sail module and comprising:
        a deployment spool coupled to the first bridle assembly;
        a deployment cable comprising:
            a first end coupled to the balloon anchor of the balloon module; and
            a second end wound about the deployment spool and coupling the first sail module to the balloon module; and
        a regulator fan coupled to the deployment spool and configured to induce aerodynamic drag to govern an unwinding rate of the deployment spool; and
    wherein the controller is configured to, during a deployment period:
        access a first altitude of the first sail module from the first set of payload instruments; and
        in response to the first altitude exceeding a threshold altitude, trigger the deployment spool to unwind the deployment cable, the deployment cable cooperating with the bridle assembly to locate the first sail module at the distance between 250 meters and 350 meters below the balloon module.

8. The system of claim 1:
    wherein the balloon module further comprises a second set of payload instruments coupled to the inflatable element; and
    wherein the controller is configured to:
        access a first relative wind velocity at the first sail module from the first set of payload instruments;
        access a second relative wind velocity at the balloon module from the second set of payload instruments;
        calculate a wind shear velocity between the balloon module and the first sail module based on the first relative wind velocity and the second relative wind velocity; and
        in response to the wind shear velocity exceeding a threshold wind shear velocity, trigger the first motorized spool to wind the first sail control cable:
            to change the pitch angle of the first control surface;
            to change the aerodynamic forces across the first control surface; and
            to adjust the altitude of the balloon module and the first sail module.

9. The system of claim 1:
    wherein the balloon module further comprises:
        a balloon anchor arranged proximal a bottom end of the inflatable element; and
        a first force sensor coupled to the balloon anchor;
    wherein the bridle assembly further comprises:
        a bridle anchor arranged proximal a top end of the first control surface; and
        a second force sensor coupled to the bridle anchor;

further comprising a deployment cable:
comprising:
a first end coupled to the balloon anchor of the balloon module; and
a second end coupled to the bridle anchor of the bridle assembly; and
configured to locate the first sail module at the distance below the balloon module; and
wherein the controller is configured to:
access a first altitude of the first sail module from the first set of payload instruments;
access a first set of force values from the first force sensor;
access a second set of force values from the second force sensor;
calculate a tensile force difference between the balloon module and the first sail module based on the first set of force values and the second set of force values; and
in response to calculating a non-zero tensile force difference and the first altitude deviating from a target altitude, trigger the first motorized spool to wind the first sail control cable:
to change the pitch angle of the first control surface;
to change the aerodynamic forces across the first control surface; and
to adjust the altitude of the balloon module and the first sail module.

10. The system of claim 1, wherein the controller is configured to:
at a first time, access a first altitude of the first sail module from the first set of payload instruments;
in response to the first altitude exceeding a first target altitude, trigger the first motorized spool to wind the first sail control cable in a first direction:
to pitch the first control surface downwardly;
to generate negative aerodynamic lift across the first control surface; and
to decrease altitude of the balloon module and the first sail module without venting lifting gas from the balloon module;
at a second time, access a second altitude of the first sail module from the first set of payload instruments; and
in response to the second altitude falling below a second target altitude, trigger the motorized spool to wind the first sail control cable in a second direction, opposite the first direction:
to pitch the first control surface upwardly;
to generate positive aerodynamic lift across the first control surface; and
to increase altitude of the balloon module and the first sail module without dropping ballast material from the balloon module.

11. The system of claim 10:
wherein the first set of payload instruments is arranged proximal the first edge of the first sail module and comprises:
a suite of ambient sensors configured to output ambient atmospheric values local to the first sail module; and
a position module configured to output altitude values of the first sail module;
wherein the controller is configured to:
at the first time, access the first altitude of the first sail module from the position module;
in response to the first altitude exceeding the first target altitude, read a first corpus of ambient atmospheric data from the suite of ambient sensors corresponding to the first altitude;
at the second time, access the second altitude of the first sail module from the position module;
in response to the second altitude falling below the second target altitude, read a second corpus of ambient atmospheric data from the suite of ambient sensors corresponding to the second altitude; and
serve the first corpus of ambient atmospheric data and the second corpus of ambient atmospheric data to a remote computer system.

12. The system of claim 1, further comprising:
a second sail module defining a third edge and a fourth edge and comprising:
a second control surface extending between the third edge and the fourth edge; and
a second motorized spool arranged proximal the fourth edge of the second sail module; and
a second bridle assembly comprising:
a third fixed sail cable:
defining a third length; and
coupling the balloon module to a third section of the second control surface proximal the third edge;
a fourth fixed sail cable:
defining a fourth length, approximating the third length; and
coupling the balloon module to a fourth section of the second control surface proximal the third edge; and
a second sail control cable:
wound about the second motorized spool;
coupled to the balloon module; and
cooperating with the third fixed sail cable and the fourth fixed sail cable to locate the second sail module interposed between the balloon module and the first sail module.

13. The system of claim 12:
wherein the balloon module further comprises a second set of payload instruments; and
wherein the controller is configured to:
access a first altitude of the balloon module from the second set of payload instruments;
access a first relative wind velocity at the first sail module from the first set of payload instruments;
access a second relative wind velocity at the balloon module from the second set of payload instruments;
calculate a first wind shear velocity between the balloon module and the first sail module based on the first relative wind velocity and the second relative wind velocity; and
in response to the first wind shear velocity approximating a null wind shear velocity and the first altitude exceeding a target altitude, trigger the second motorized spool to wind the second sail control cable:
to pitch the second control surface downwardly;
to generate negative aerodynamic lift across the second control surface; and
to decrease altitude of the balloon module, the second sail module, and the first sail module without venting lifting gas from the balloon module.

14. The system of claim 1:
wherein the balloon module comprises a balloon anchor arranged proximal a bottom end of the inflatable element;

wherein the ballast module comprises a ballast anchor arranged proximal a top end of the container;
wherein the first motorized spool comprises:
   a first spool section; and
   a second spool section adjacent the first spool section;
wherein the first sail control cable comprises:
   a first end coupled to the balloon anchor of the balloon module; and
   a second end wound about the first spool section of the first motorized spool in a first direction; and
wherein the first bridle assembly further comprises a second sail control cable:
   comprising:
      a third end coupled to the ballast anchor of the ballast module; and
      a fourth end wound about the second spool section of the first motorized spool in a second direction, opposite the first direction; and
   cooperating with the first sail control cable to define a length approximating the first length of the first fixed sail cable and the second length of the second fixed sail cable.

15. The system of claim 14, wherein the controller is configured to:
   at a first time, access a first altitude of the first sail module from the first set of payload instruments;
   in response to the first altitude exceeding a first target altitude, trigger the first motorized spool to rotate in the first direction:
      to pitch the first control surface downwardly;
      to generate negative aerodynamic lift across the first control surface; and
      to decrease altitude of the balloon module and the first sail module;
   at a second time, access a second altitude of the first sail module from the first set of payload instruments; and
   in response to the first altitude falling below a second target altitude, trigger the first motorized spool to rotate in the second direction, opposite the first direction:
      to pitch the first control surface upward;
      to generate positive aerodynamic lift across the first control surface; and
      to increase altitude of the balloon module and the first sail module.

16. The system of claim 14:
wherein the first fixed sail cable comprises:
   a first end coupled to the balloon anchor of the balloon module; and
   a second end coupled to the first section of the first control surface proximal the first edge;
wherein the second fixed sail cable comprises:
   a first end coupled to the balloon anchor of the balloon module; and
   a second end coupled to the second section of the first control surface proximal the first edge; and
further comprising:
   a third fixed sail cable defining a third length approximating the first length and the second length, and comprising:
      a first end coupled to the ballast anchor of the ballast module; and
      a second end coupled to the first section of the first control surface proximal the first edge; and
   a fourth fixed sail cable:
      defining a fourth length approximating the first length, the second length, and the third length;
      comprising a first end coupled to the ballast anchor of the ballast module;
      comprising a second end coupled to the second section of the first control surface proximal the first edge; and
      cooperating with the third fixed sail cable, the second fixed sail cable, the first fixed sail cable, the first sail control cable, and the second sail control cable to form a triangular cable frame bordering the first edge and the second edge of the first sail module and configured to stabilize the first control surface in a horizontal configuration.

17. A system comprising:
a balloon module comprising:
   an inflatable element; and
   a volume of lifting gas arranged within the inflatable element and generating aerostatic lift;
a first sail module:
   defining a first edge and a second edge, opposite the first edge;
   arranged below the balloon module; and
   comprising:
      a first set of payload instruments;
      a first control surface arranged proximal the second edge of the first sail module; and
      a first actuator coupled to the first control surface and configured to adjust a pitch of the first control surface;
a ballast module comprising:
   a container arranged below the first sail module; and
   a ballast material arranged within the container; and
a controller configured to, during a first altitude control cycle:
   access a first altitude of the first sail module from the first set of payload instruments; and
   in response to the first altitude deviating from a first target altitude, trigger the first actuator to:
      change a pitch angle of the first control surface;
      generate aerodynamic lift across the first control surface; and
      adjust an altitude of the balloon module and the sail module toward the first target altitude.

18. A method for adjusting altitude of a system comprising:
   during a deployment period, triggering a deployment module to unwind a deployment cable to locate a sail module at a distance below a balloon module;
   at a first time, accessing a first altitude from a set of payload instruments coupled to the sail module;
   in response to the first altitude exceeding a first target altitude, initiating a first altitude control cycle;
   during the first altitude control cycle, triggering a motorized spool to wind a sail control cable in a first direction:
      to pitch a control surface of the sail module downwardly;
      to generate negative aerodynamic lift across the control surface; and
      to decrease altitude of the balloon module and the sail module;
   at a second time, accessing a second altitude from the set of payload instruments coupled to the sail module;
   in response to the second altitude falling below a second target altitude, initiating a second altitude control cycle; and during the second altitude control cycle, triggering the motorized spool to wind the sail control cable in a second direction, opposite the first direction:
- to pitch the control surface of the sail module upwardly;
- to generate positive aerodynamic lift across the control surface; and
- to increase altitude of the balloon module and the sail module.

19. The method system of claim 18, further comprising during the first altitude control cycle:
- following triggering of the motorized spool to wind the sail control cable in the first direction, accessing a rate of descent from the set of payload instruments coupled to the sail module;
- detecting a stalling condition of the sail module in response to the rate of descent falling below a target descent rate; and
- in response to detecting the stalling condition, triggering a first valve at a ballast container arranged below the sail module to release ballast material from the ballast container to increase altitude of the balloon module and the sail module.

20. The method of claim 18, further comprising during the second altitude control cycle:
- following triggering of the motorized spool to wind the sail control cable in the second direction, accessing a rate of ascent from the set of payload instruments coupled to the sail module;
- detecting a stalling condition of the sail module in response to the rate of ascent falling below a target ascent rate; and
- in response to detecting the stalling condition, triggering a second valve at an inflatable element of the balloon module to vent lifting gas from the inflatable element to decrease altitude of the balloon module and the sail module.

* * * * *